Sept. 16, 1930.  F. G. WIELAND  1,776,227
ASSEMBLING MACHINE AND METHOD
Filed Jan. 19, 1926  19 Sheets-Sheet 1

INVENTOR
Frederick G. Wieland
BY
George Ramsey
HIS ATTORNEY

Sept. 16, 1930.    F. G. WIELAND    1,776,227
ASSEMBLING MACHINE AND METHOD
Filed Jan. 19, 1926    19 Sheets-Sheet 2

INVENTOR
Frederick G. Wieland
BY
his ATTORNEY

Sept. 16, 1930.  F. G. WIELAND  1,776,227
ASSEMBLING MACHINE AND METHOD
Filed Jan. 19, 1926  19 Sheets-Sheet 6

INVENTOR
Frederick G. Wieland
BY
*George Ramsey*
his ATTORNEY

Sept. 16, 1930.   F. G. WIELAND   1,776,227
ASSEMBLING MACHINE AND METHOD
Filed Jan. 19, 1926   19 Sheets-Sheet 7

INVENTOR
Frederick G. Wieland
BY
his ATTORNEY

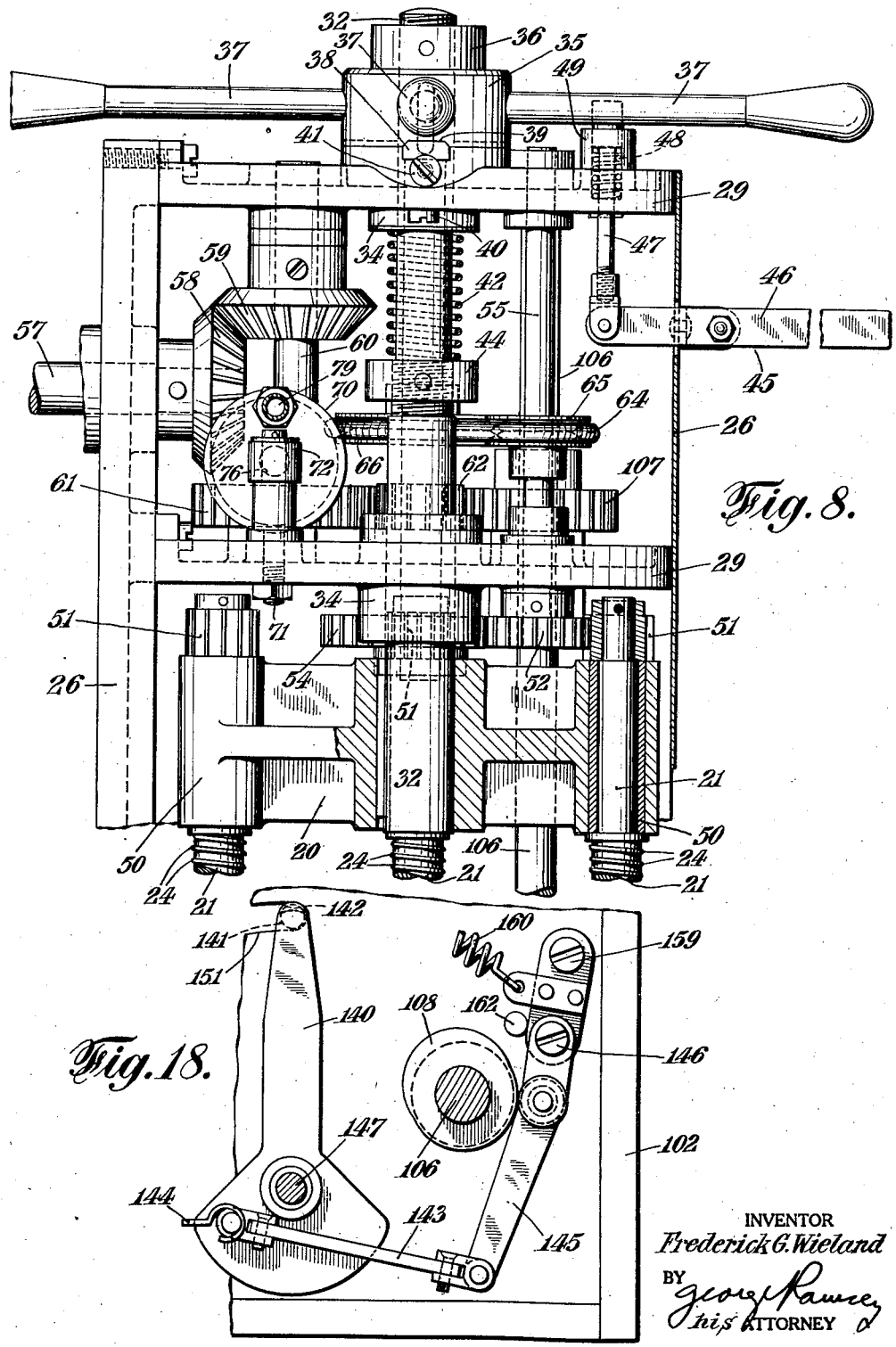

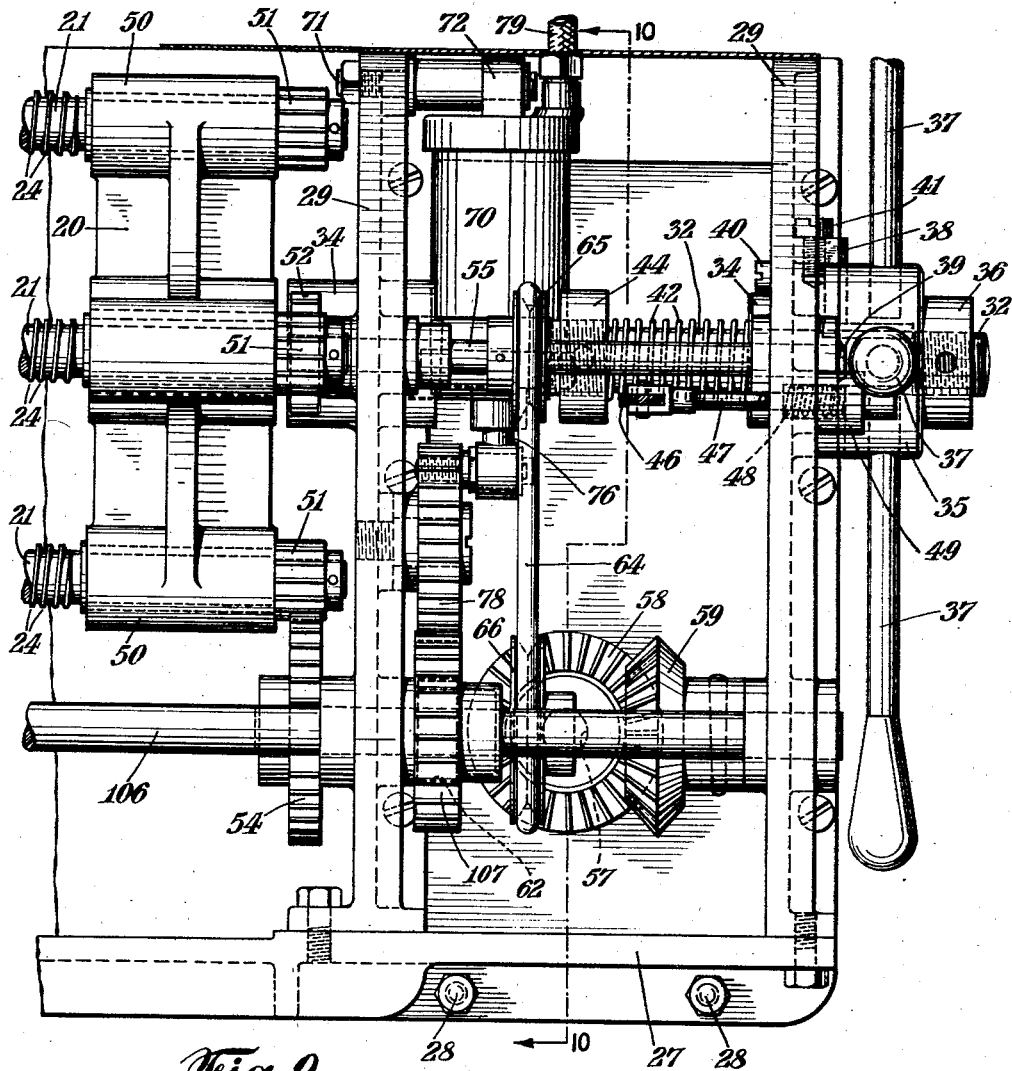

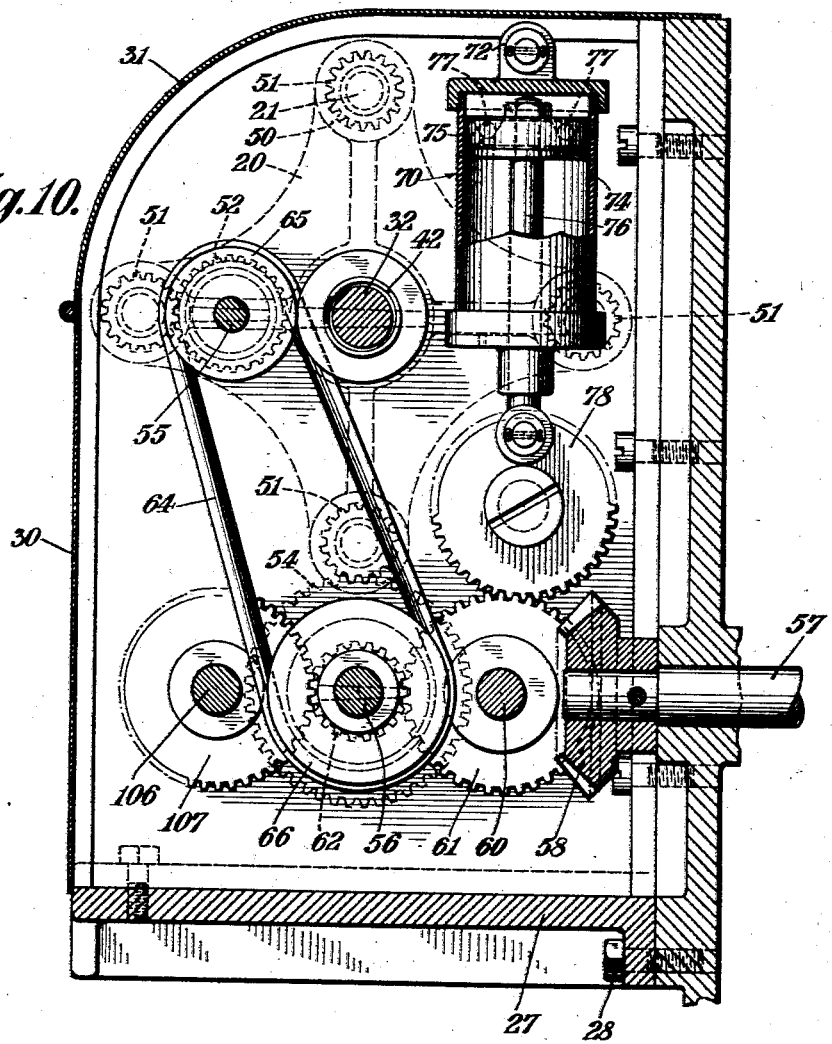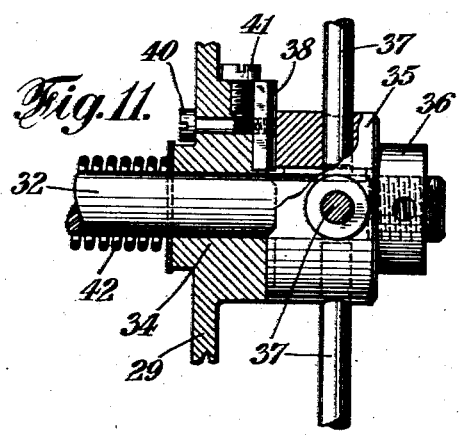

Sept. 16, 1930. F. G. WIELAND 1,776,227
ASSEMBLING MACHINE AND METHOD
Filed Jan. 19, 1926 19 Sheets-Sheet 11

INVENTOR
Frederick G. Wieland
BY
HIS ATTORNEY

Sept. 16, 1930.   F. G. WIELAND   1,776,227
ASSEMBLING MACHINE AND METHOD
Filed Jan. 19, 1926   19 Sheets-Sheet 12
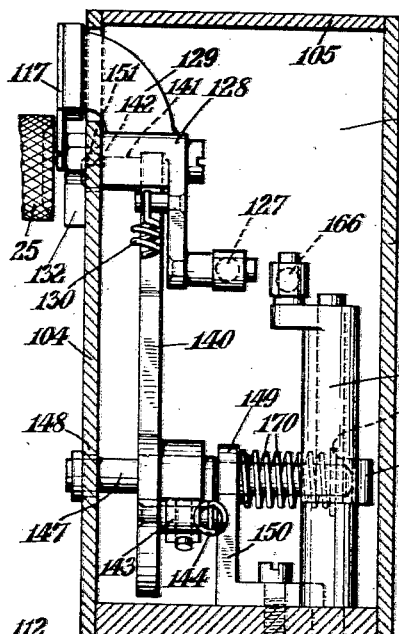
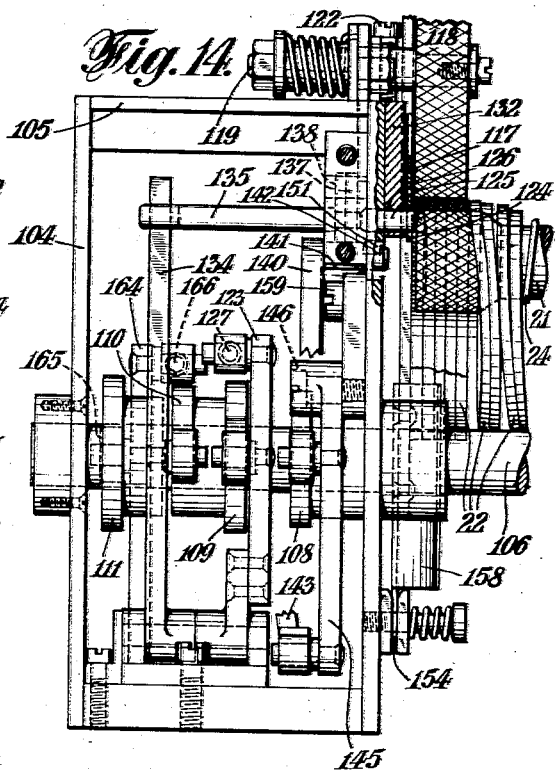
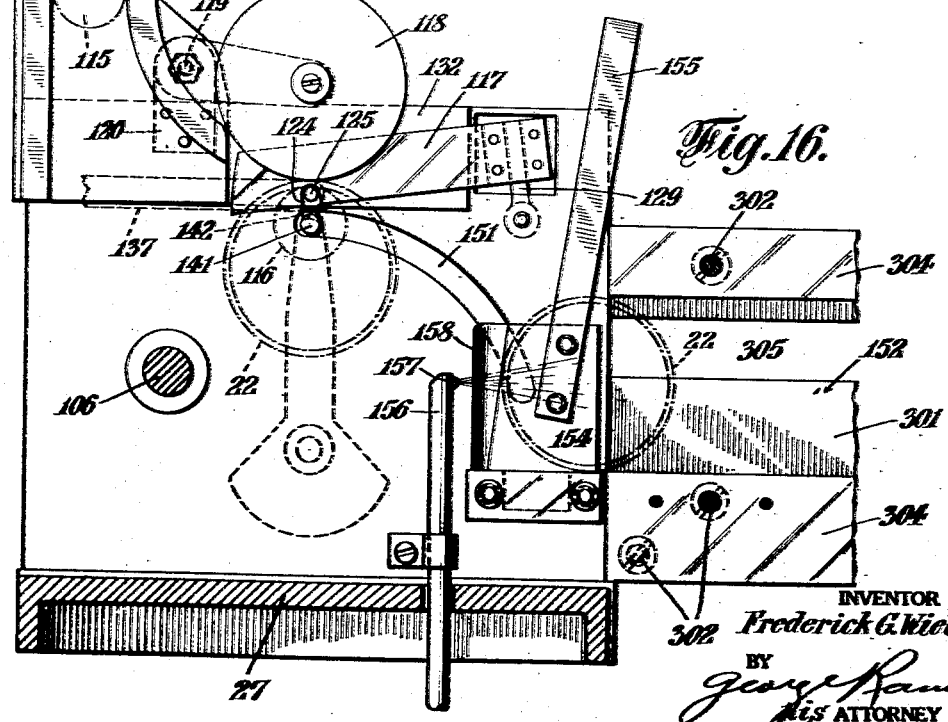
INVENTOR
Frederick G. Wieland
BY
George Ramsey
HIS ATTORNEY Sept. 16, 1930.  F. G. WIELAND  1,776,227
ASSEMBLING MACHINE AND METHOD
Filed Jan. 19, 1926  19 Sheets-Sheet 13

INVENTOR
Frederick G. Wieland
BY
George Ramsey
his ATTORNEY

Sept. 16, 1930.  F. G. WIELAND  1,776,227
ASSEMBLING MACHINE AND METHOD
Filed Jan. 19, 1926   19 Sheets-Sheet 14

INVENTOR
Frederick G. Wieland
BY
George Ramsey
HIS ATTORNEY

Sept. 16, 1930.  F. G. WIELAND  1,776,227
ASSEMBLING MACHINE AND METHOD
Filed Jan. 19, 1926   19 Sheets-Sheet 15

INVENTOR
Frederick G. Wieland
BY
George Ramsey
his ATTORNEY

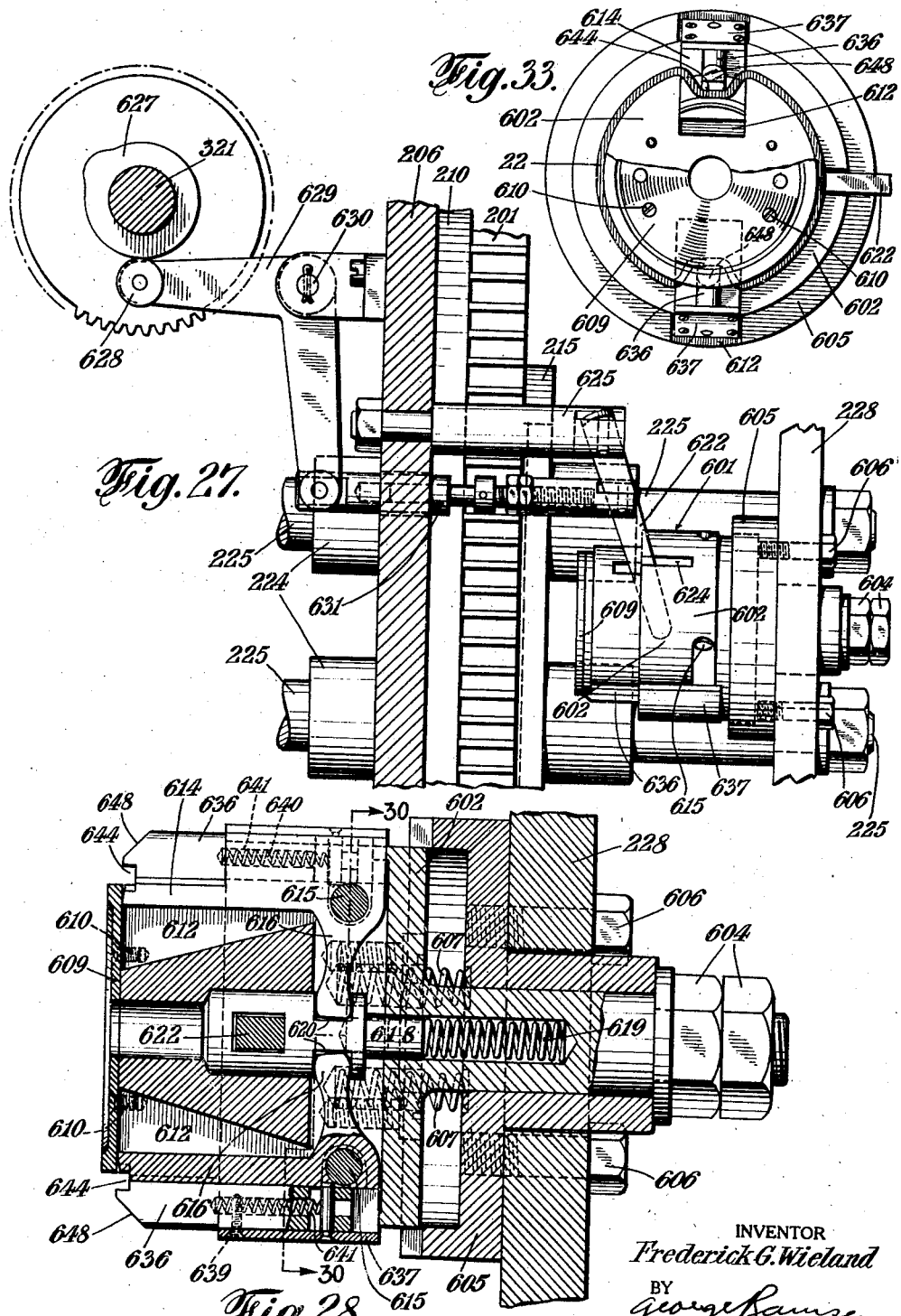

Sept. 16, 1930.  F. G. WIELAND  1,776,227
ASSEMBLING MACHINE AND METHOD
Filed Jan. 19, 1926   19 Sheets-Sheet 17
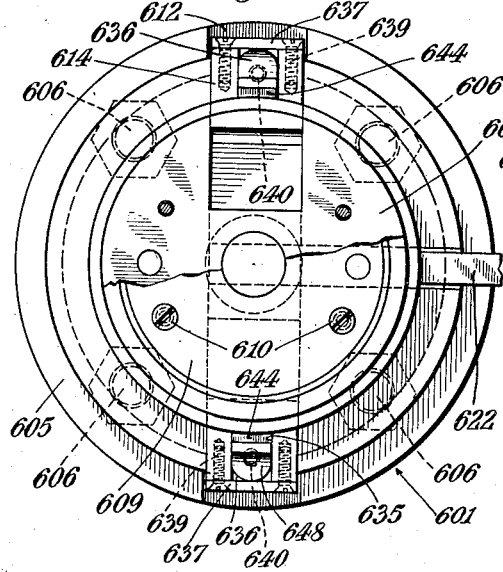
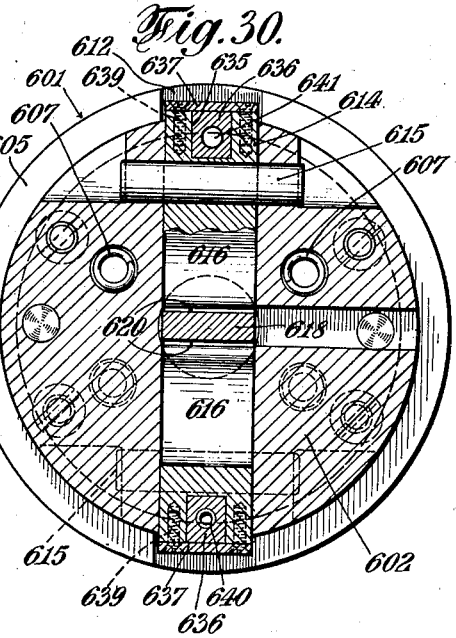
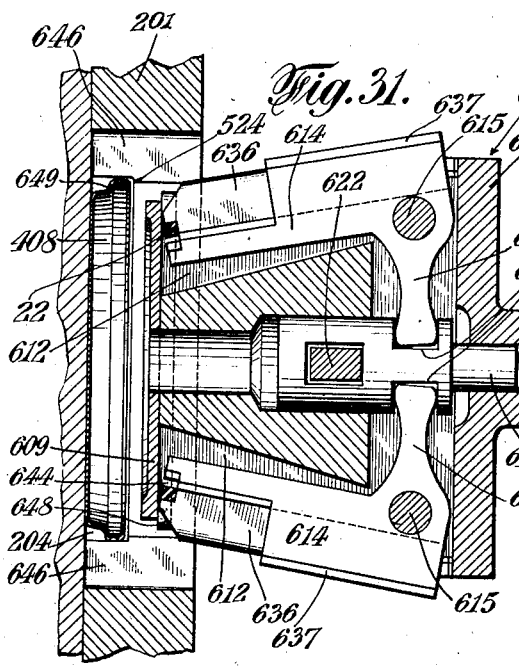
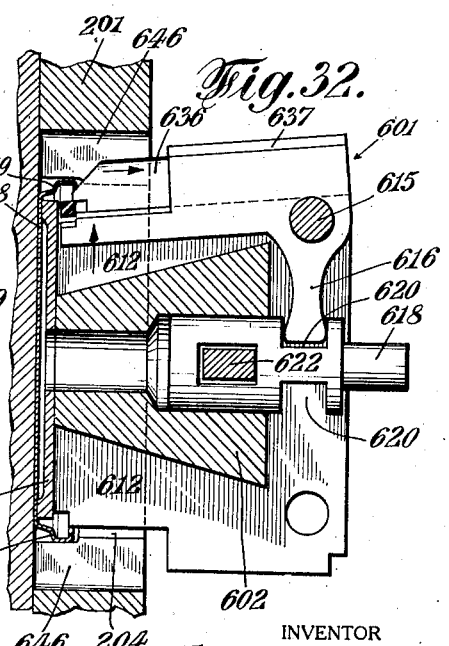
INVENTOR
Frederick G. Wieland
BY
his ATTORNEY Sept. 16, 1930.  F. G. WIELAND  1,776,227
ASSEMBLING MACHINE AND METHOD
Filed Jan. 19, 1926  19 Sheets-Sheet 18

INVENTOR
Frederick G. Wieland
BY
his ATTORNEY

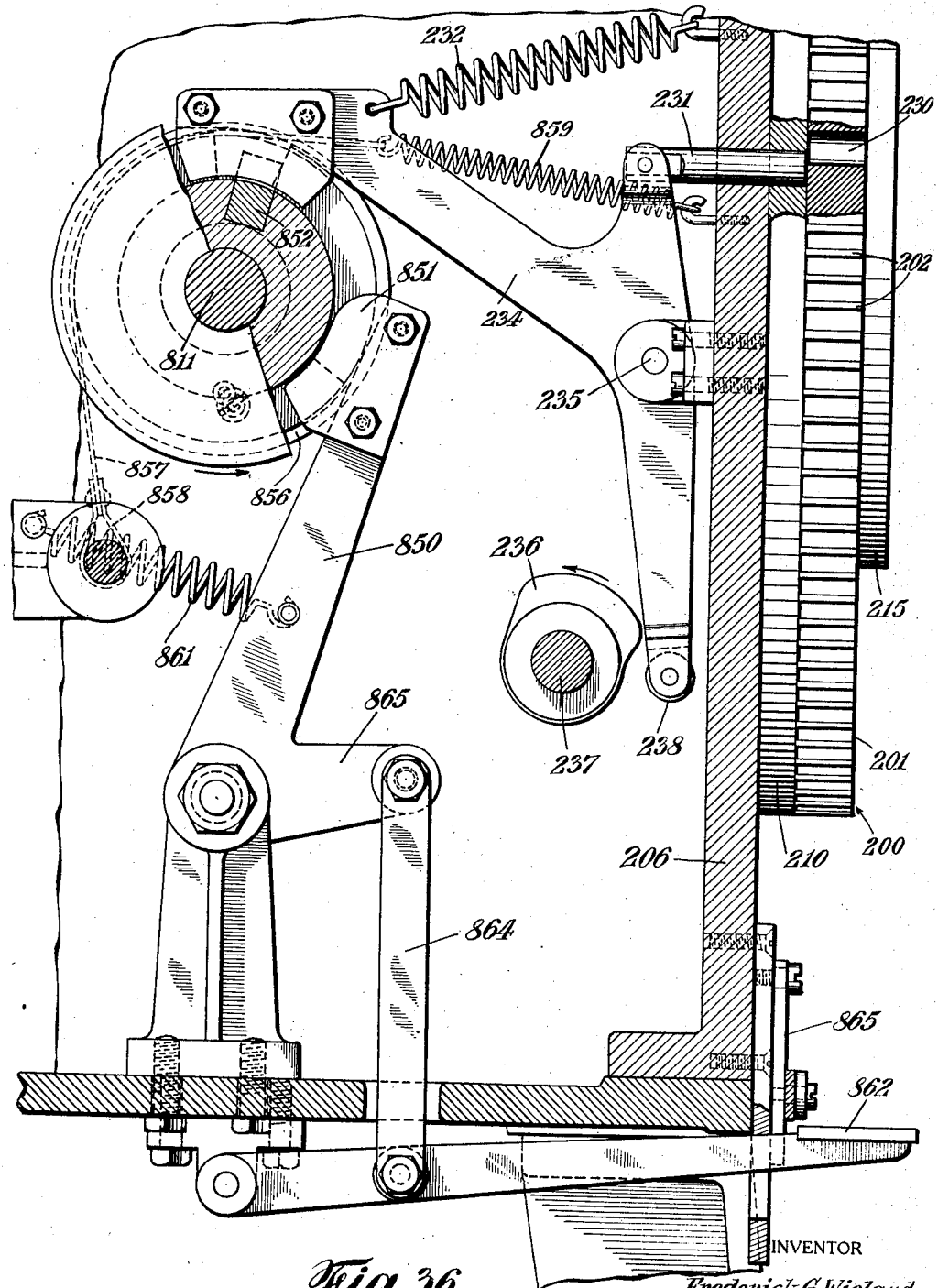

Patented Sept. 16, 1930

1,776,227

UNITED STATES PATENT OFFICE

FREDERICK G. WIELAND, OF WOODHAVEN, NEW YORK, ASSIGNOR TO ANCHOR CAP AND CLOSURE CORPORATION, OF LONG ISLAND CITY, NEW YORK, A CORPORATION OF NEW YORK

ASSEMBLING MACHINE AND METHOD

Application filed January 19, 1926. Serial No. 82,365.

The present invention relates generally to a method and apparatus for assembling articles and particularly to a method and apparatus for assembling closure caps and ring gaskets or the like.

Heretofore in the art, caps and gaskets have, to a large extent, been manufactured and shipped separately to the canner or packer who assembles the caps and gaskets manually and applies them in the assembled state to containers filled with cooked materials. In some cases, the caps are such that the gaskets may be inserted therein by the manufacturer and shipped to the packer assembled without the gaskets becoming dislodged en route. The latter at the present time is by far the more desirable way of handling these articles.

Irrespective of whether the caps and gaskets are assembled by the manufacturer and shipped in that state or whether they are shipped separately and assembled by the packer, it has been customary to utilize skilled laborers, usually girls, to manually insert the gaskets in the respective caps. In doing this, a supply of caps is placed upon a table with gaskets nearby and the workers sit at the table and handle each cap individually, placing a flexible ring gasket therein and dropping the assembled caps and gaskets in boxes at their feet. These caps are gathered up by workmen and turned over to other girls who stack the caps one upon another, count, and place them in suitable cases, the packing of the caps in cases requiring substantially half as much labor as the assembling of the caps and gaskets.

A preferred form of cap particularly adapted for side seals on vessels is one having a depending skirt with a circumferential bead therein and preferably having the bead at the lower part of the skirt. With this type of cap it is necessary to insert the respective gaskets in the partially enclosed bead so that the gaskets will by their own elasticity remain in the bead of the cap. The task is rendered more difficult by the fact that the gaskets, in the various steps of their manufacture, after being properly cut, become twisted and distorted out of their natural shape. Skilled laborers in inserting the gaskets usually press one portion of the gasket in the bead of the cap and run their fingers along the bead and gasket until it is straightened out in the bead of the cap. Their fingers are frequently cut in contacting with the edges of metallic caps and the work generally is very monotonous. The most skilled workers are able to assemble only a few thousand of the caps and gaskets daily. Other employees keep the tables filled with caps and gaskets and pack the assembled caps and gaskets in suitable shipping cases. The latter task involves considerable work, and handling of the unstacked caps which frequently causes the gaskets to fall out of the beads, necessitating their return to the assembly table. Since caps of this character are made and used in large quantities, as many as a million a day being manufactured at times, the labor required for the work is exceedingly expensive and increases greatly the cost of the finished articles.

An object of the present invention is to provide a machine and method adapted to automatically assemble caps and gaskets.

Another object of the invention is to provide a method and machine for separating flexible ring gaskets and assembling them with suitable closure caps.

Another object of the invention is to provide a machine and method adapted to constrict flexible gaskets to a size smaller than the skirt of the caps, insert the gaskets in the caps and permit them to expand to fit therein.

Another object of the invention is to adapt such a machine and method to operate with commercial ring gaskets which are usually twisted and distorted from their natural shapes by certain steps in their manufacture.

Another object is the provision of a plurality of gasket supporting spindles adapted to be rotated consecutively to a selecting mechanism which removes the gaskets individually and feeds them to a guideway leading to other mechanisms.

Another object is to provide a rotatable member, or turret wheel, having a plurality of apertures therein adapted to seat gaskets; to provide a gasket selecting mechanism adapted to feed gaskets to a guideway leading to the turret wheel; and to provide positioning devices for placing said gaskets in said apertures.

Another object is to provide cap feeding devices adapted to engage the gaskets in the apertures of the turret wheel and to feed caps only to the apertures having gaskets therein, and to provide means for positioning said caps in the apertures adjacent the gaskets therein.

A further object is to provide a turret wheel adapted to seat gaskets therein with a gasket feeding mechanism on one side thereof and cap feeding mechanism on the other side of the wheel to feed caps and gaskets to the seats thereon; to provide an assembling mandrel to assemble said caps and said gaskets; and to provide a member for expelling the assembled caps and gaskets from said seats.

A still further object of the invention is to provide a turret wheel having a plurality of apertures therein; to provide cap and gasket feeding mechanisms to feed caps and gaskets to said apertures; to provide a disc adjacent the turret wheel having a plurality of members thereon adapted to enter said apertures and engage certain of said caps and said gaskets to position one of said caps and one of said gaskets, to assemble a different cap and gasket, and to expel an assembled cap and gasket.

Another object of the invention is to provide an automatic clutch adapted to shut down the machine if certain of the mechanisms fail to operate; to provide other devices for eliminating damage to the machine by disconnecting the driving mechanism when the power required to operate the machine exceeds a predetermined maximum; and to provide other automatic features which render the machine practically self-operative.

Further objects of the invention contemplate a machine of the above characteristics, which is of such strong and simple construction and such accurate operation as to insure its proper performance under all conditions commonly encountered in this class of work, and to provide a machine which will greatly minimize the amount of labor involved in assembling caps and gaskets and packing them in cases.

Other and further objects of the invention will be obvious upon an understanding of the illustrated embodiment about to be described or will be obvious from the accompanying drawings, or indicated in the appended claims; and various advantages secured by the invention other than those hereinafter specifically referred to will occur to one skilled in the art or become evident upon the employment of the invention in practice.

A preferred embodiment of the invention has been selected for purposes of illustration and description and is shown in the accompanying drawings wherein, Fig. 1 illustrates generally the various steps in the assembly of caps and gaskets;

Fig. 8 is a detailed top plan view of the operating mechanisms of the gasket supporting members;

Fig. 9 is a side elevational view of the mechanism shown in Fig. 8;

Fig. 10 is a sectional view along line 10—10 of Fig. 9;

Fig. 11 is a detailed view of the hub and holding means for positioning the supporting members;

Fig. 14 is an end view of the feeding mechanism;

Figs. 16 and 17 are detailed views showing the feeding of a gasket from the supporting members to a guideway leading to the turret wheel;

Figs. 18 and 19 are detailed views showing the actuating mechanism for the swinging arm;

Fig. 27 is a detailed elevational view of the mechanism for inserting gaskets within the caps;

Fig. 28 is a sectional view through the center of the mandrel adapted to insert the gaskets into the caps;

Fig. 29 is an end view of the mandrel shown in Fig. 28 with certain parts broken away;

Fig. 30 is a sectional view along the line 30—30 of Fig. 28;

Figs. 31 and 32 are sectional views showing the assembling mandrel in two positions with respect to the cap and gasket;

Fig. 33 is an end elevational view of the mandrel shown in Fig. 31, with certain portions broken away for simplicity;

Fig. 36 is a detailed view of the automatic clutch;

Fig. 38 is a detailed view of the counting and marking device shown in Figure 5.

Figure 1:
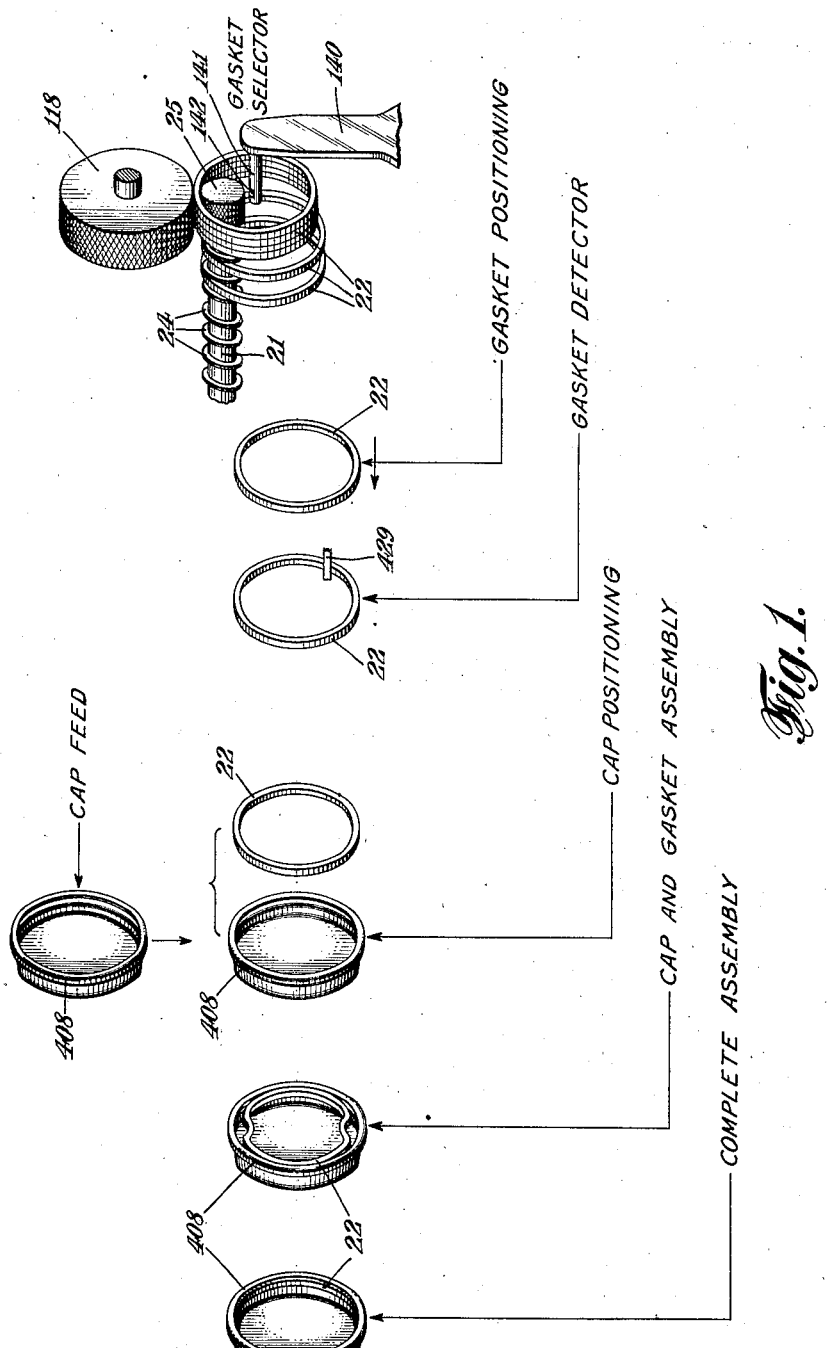

A preferred embodiment of a machine illustrating the present invention and illustrating one way of practicing the method may be generally described as comprising a box-like frame mounted upon suitable supporting legs with a motor and other associated driving mechanisms enclosed within the box. At one end of the machine, there is mounted a rotatable head or reel having a plurality of gasket supporting members thereon. These members are filled with gaskets which an operator slides over the ends of the members like rings on a pole or rod. A shaft connects the head to a suitable hand wheel adapted to rotate the reel or supporting members consecutively to their operating positions. Automatic locking mechanisms stop the hand wheel in the desired positions so that suitable gears are operative to rotate one or more of the supporting members on the reel or rotatable head. All of the supporting members are provided with wide open threads so that gaskets placed thereon are fed longitudinally thereof when these members are rotated. When the hand wheel is locked in position, one of the rotating members is positioned adjacent a selecting and feeding mechanism. By quickly turning the hand wheel, the gasket reel is rotated to bring into selecting position another supporting member without interrupting the operation of the machine. The gaskets are selected individually from the supporting member and fed to a guideway leading to a turret wheel by the selecting mechanism mounted to operate adjacent the free end of the supporting member which the hand wheel brought to feeding position. The selecting mechanism consists generally of a stop member adapted to release gaskets one at a time, and when so released, the gaskets are received by a supporting pin and afterwards dropped on to a swinging arm which conveys them to the guideway leading to a turret assembly wheel.

A turret wheel or other rotatable member having a plurality of apertures formed adjacent its periphery is mounted on the front of the machine and rotated intermittently by the driving mechanisms within the machine. A disc mounted adjacent the turret wheel and substantially parallel thereto is reciprocated toward and away from the turret wheel during the stop periods thereof to bring certain members into engagement with the apertures therein. The movement of the disc inward causes a plurality of operations to take place simultaneously at different stations namely to position a gasket in one aperture; to place a cap in another aperture and position the same therein; to assemble a cap and a gasket in a third aperture; to move the assembled cap and gasket from a fourth aperture; and to insert a member into a fifth aperture to remove any gaskets which for any reason may not have been inserted in a cap.

Caps required in the operation of the machine are placed in a suitable bin on top of the machine and may be fed manually to a guideway leading to one of the apertures in the turret wheel. A suitable pivoted member is placed within the guideway to prevent the caps from feeding too rapidly and to allow only a single cap to approach the turret wheel upon oscillation of the member. It is desirable to feed caps only to the apertures having gaskets therein. For this purpose, an automatic feeler device is adapted to engage the gasket placed in each aperture as the aperture in its step by step movement passes a particular station. When the feeler does not engage a gasket, it moves sufficiently far to touch the side wall of the aperture and the additional movement prevents the operation of the cap feeding device so that no cap reaches the cap feed station. The caps and gaskets are positioned relative to each other by means of members on the disc adjacent the turret wheel. The gaskets are thereafter engaged by a mandrel having a pair of jaws which draw the gasket about the outer end of the mandrel. The end of the mandrel is now inserted within the skirt of the cap at which time the jaws release the gasket and permit it to assume its natural ring shape within the bead of the cap. Thereafter the assembled cap and gasket moves step by step until it is adjacent another member of said disc which expels the cap from the aperture on to a trough. If there should be an unassembled gasket in the aperture it is not removed by this member on to the trough, but passes on to the next station where it is removed by a cylindrical plunger. The assembled caps and gaskets form a horizontal stack which is forced along the trough as additional caps are placed thereon. The assembled articles are removed from time to time from the end of the stack by an operator. Prior to their removal, the assembled caps pass and engage a counting device which marks predetermined caps, that is, every twenty-fifth or fiftieth cap as desired to facilitate packing.

Rubber gaskets are fed in at one side of the machine, and caps at the other. They meet and are positioned in the apertures of a turret wheel which moves step by step past respective stations. The gaskets are placed within the beads of the caps and the assembled caps and gaskets are removed on to a trough where they are automatically counted and placed at the disposal of the operator for packing or other purposes.

Referring to the drawings, Fig. 1 illustrates schematically the various steps in the progress of the cap and gasket from their separate feeding mechanisms and indicating their relative positions at various stages up to their actual assembly. The steps shown in this figure will be understood from the following general description of Figs. 1 and 2, wherein one form of mechanism for accomplishing the results indicated and for practicing the method is shown more or less diagrammatically. It will be noted that the gaskets 22 are supported at one end of the machine on a gasket reel comprising four horizontal spindles 21, one of which is rotated continuously to move the gaskets thereon toward the selector 140. The gasket selector receives the gaskets dropped from the end of this spindle and feeds them individually through a suitable guideway to a gasket positioning station at the end thereof. A pair of pistons 324 and 325 mounted on the respective sides of the turret wheel meet in an aperture thereof, which is adjacent the positioning station, with a gasket 22 therebetween, press the gasket which has been removed from the end of the guideway into a vertical plane, and position it within the aperture. Thereafter, the pistons are removed leaving the gasket in the aperture which is then moved by means of the step by step movement of the turret wheel until it reaches the gasket detector station where a feeler 429 engages it in the aperture causing the cap feeder to release a cap which rolls to the end of a chute 402 where it awaits the arrival of the aperture containing the gasket. At the next step of the turret wheel, the aperture containing the gasket reaches the cap positioning station at the end of the cap chute. Here, a pair of pistons 501 and 518 similar to the gasket positioning pistons position the cap adjacent the gasket in the aperture. The turret wheel then brings the aperture to the cap and gasket assembling station where a mandrel engages the gasket with a pair of oppositely disposed jaws or fingers 614 which close drawing the gasket down on the end of the mandrel by making two inward diametrically opposed loops to reduce the size thereof. Thereafter, the mandrel is moved into the skirt of the cap and the gasket released to return to its original shape within the bead of the cap. The assembled caps and gaskets are then moved to a discharge station where the piston 702 ejects them on to a trough 701 where they accumulate one by one and are moved under a cap counter and marker 713 which marks every twenty-fifth, fiftieth or hundredth cap as desired to facilitate packing thereof. Any loose gaskets which have not been assembled with the caps are not discharged on to this trough because the piston 702 is sufficiently small not to engage them. These gaskets are removed at the gasket discharge station by a piston 725 substantially the same size as the apertures in the turret wheel.

Figure 2:
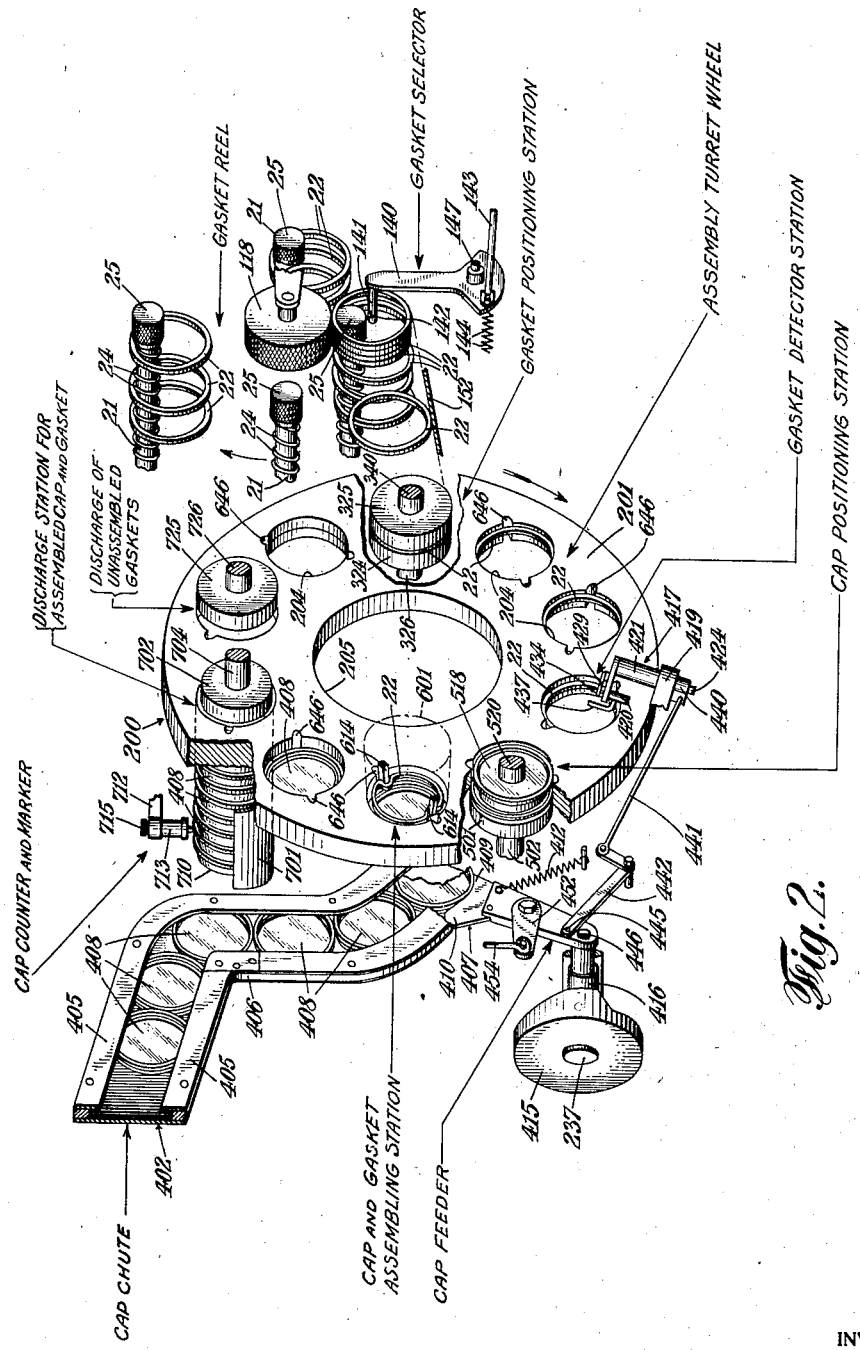
Fig. 2 is a schematic view illustrating the various steps in the assembly of caps and gaskets performed by the mechanisms associated with the turret wheel in the present machine.
Figure 3:
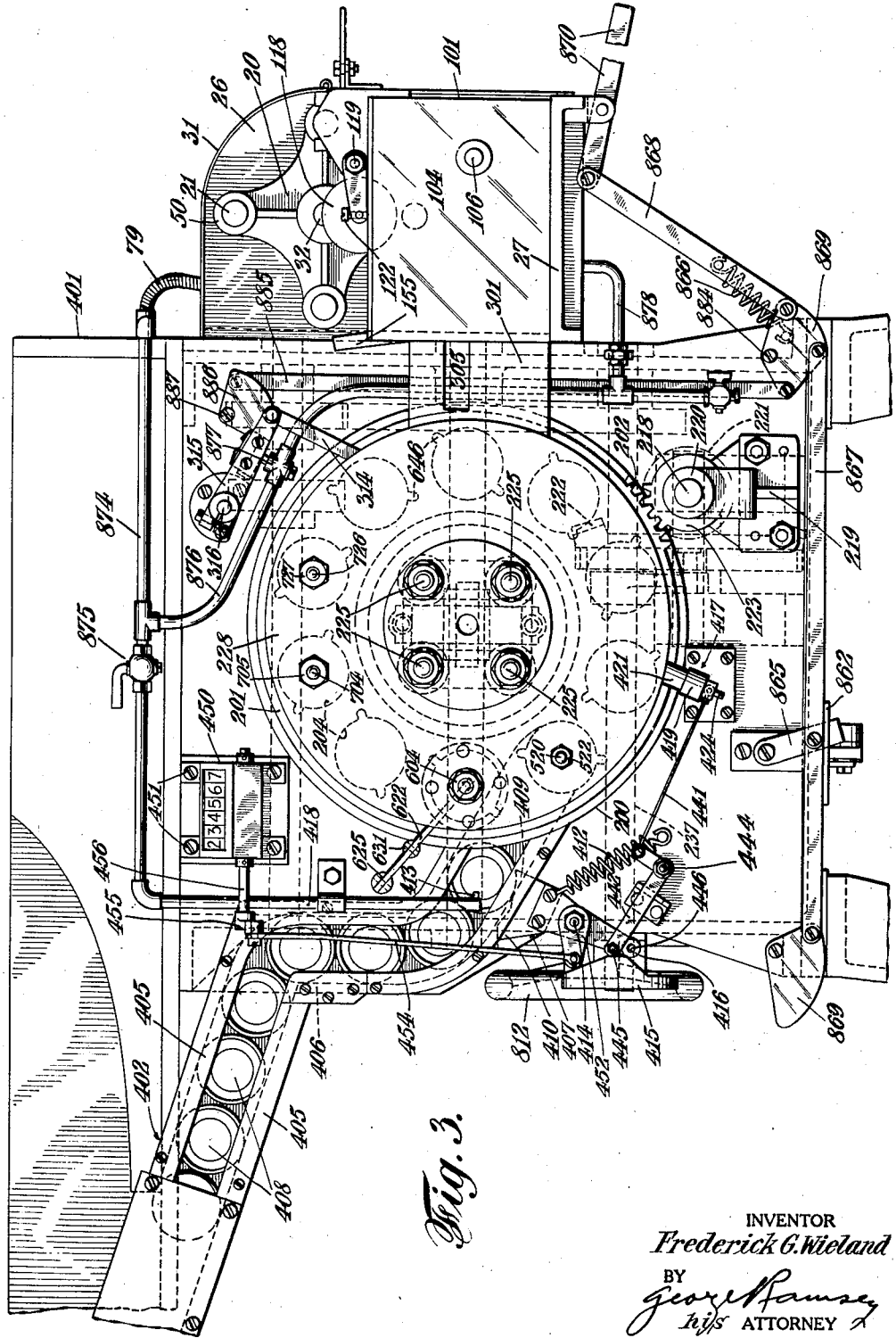
Fig. 3 is a front elevational view of the machine with certain parts broken away for convenience.

The diagrammatic sketches in Figs. 1 and 2 together with the description thereof indicate generally the various steps and their sequence in the preferred form of the machine; the various mechanisms performing these steps will now be described.

Gasket feeding mechanism

A gasket feeding mechanism is mounted at one end of the machine and may be considered as comprising gasket supporting devices and selecting mechanism. The supporting devices retain the gaskets in proper position so that the selecting mechanism can feed the gaskets individually to a suitable guideway which leads to the apertures in the turret wheel.

The supporting mechanism, shown more particularly in Figs. 4, 6, and 9 to 12 inclusive, comprises a reel formed by a rotatable head 20 having four horizontal spindles 21 mounted thereon at intervals of 90°. These spindles are of relatively small size compared to the diameter of the gaskets 22, so that the operator may place a large number of gaskets on one of the spindles during a period of inactivity thereof. Each spindle may be provided with small helical threads 24, having a pitch substantially equal to the width of the gaskets so that the spindles when rotated cause the gaskets supported by gravity thereon to move toward the outer ends of the spindles and the threads operate to separate the gaskets one from the other so that they hang freely suspended on the spindles in a series of single thickness. The outer ends of the spindles are somewhat larger than the body and have knurled portions 25 which are utilized to remove irregularities from the gaskets as described hereinafter.

The operating mechanism for the gasket reel is enclosed in a casing 26, at the end of the machine which may comprise essentially a shelf-like horizontal portion 27, secured to the side of the machine by bolts 28. Suitable castings 29 form the ends of the casing and a piece of sheet metal 30 fits over these castings having a hinged lid 31 and forms the cover for the casing. A horizontal shaft 32 is mounted in suitable bearings 34 in the upright castings 29 and extends through the castings so that the gasket reel may be mounted at one end of the shaft exteriorly of the casing and a suitable hub 35 may be keyed to the other end thereof and adjusted longitudinally of the shaft by the threaded collar 36. A series of spokes 37 are mounted in suitable apertures in the hub 35 and serve as handles for rotating the horizontal shaft 32. A cam 38 engages the inner surface of the hub 35 and is adapted to fit into the notches 39 to stop the rotatable head 20 in predetermined positions and yieldably hold it. The cam 38 is held in position by a screw 40 which also positions the cam with respect to the hub 35 and which is held in adjusted position by the set screw 41. A spring 42, on shaft 32 between the collar 44 and the casting 29 resiliently holds the hub 35 in contact with the cam 38. Accordingly, the head 20 may be rotated by means of the spokes 37 to any desired position, cam 38 tending to stop it in its four customary positions as will be explained hereinafter.

A positive hand operated stop is effective to lock the reel in predetermined positions and comprises a handle 46 pivotally mounted on the casing 26 adapted to move the member 47 in opposition to the spring 48 mounted in barrel 49. The stop 45 prevents the movement of the spokes 37, and the rotatable head 20 except when the handle 46 is manually operated to remove the member 47 from engagement with the spokes. It is therefore, impossible for the operator accidentally to operate the rotatable head since a positive stop is furnished to supplement the action of cam 38 and to hold the spindles in proper position at all times.

The spindles 21 are mounted in bearings 50, in the rotatable head 20 and each spindle has a gear 51, adjacent its bearing. The stop 47 and cam 38 are adapted to position the rotatable head 20, so that the gears on two of the spindles are in contact with gears 52 and 54 on shafts 55 and 56 mounted in the castings 29. A shaft 57 is operatively connected to the main motive power of the machine and rotates at all times during the operation of the machine. The shaft extends into the casing enclosing the driving mechanism for the spindles 21 and has mounted on its end a bevel gear 58 and through it furnishes power for the gasket feeding mechanism. The bevel gear 58, meshes with bevel gear 59, on shaft 60 mounted in suitable bearings in the castings 29, and drives through gear 61, on shaft 60, gear 62, on shaft 56, gear 54, and one of the gears 51, on the spindles 21. Another gear 51 is driven by means of the gear 52, on shaft 55, through the belt 64, on the pulleys 65 and 66, on shafts 55 and 56, respectively.

The above described mechanism may be adapted to rotate continuously two of the spindles 20, one of which may be positioned in front of the selecting mechanism to feed gaskets thereto, the other of which may be continuously rotated so that the gaskets will be near the ends of the spindles and in readiness to replace the active spindle without interrupting the operation of the machine. If desirable, the belt 64 may be removed from its pulleys and only the spindle in front of the selecting mechanism rotated since this spindle rotates sufficiently rapid to move the gaskets to the end thereof without affecting the operation of the machine when one spindle replaces another. The idle spindles are filled with gaskets by the operator and are kept in readiness to be rotated into mesh with the gears 52 and 54.

As will be described hereinafter compressed air is desirable for certain parts of the machine and while any source of compressed air is satisfactory it is desirable to have the machine complete within itself and therefore, an air pump 70 may be mounted on one of the castings 29 by means of a bolt 71, having a rotatable sleeve 72 thereon. The pump cylinder 74 is in vertical position and has a piston 75 on a piston rod 76. Suitable valves 77, which may for convenience be ball check valves, are mounted in the piston to permit the entry of air into the cylinder back of the piston on the downward stroke thereof. A gear 78 also mounted on one of the castings 29, meshes with gear 61, and is rotated thereby. The end of the piston rod 76, is eccentrically mounted on the gear 78 and the entire pump oscillates like the pendulum of a clock as the gear 78 reciprocates the piston and forces compressed air through the tube 79.

The mechanism about to be described cooperates with the gasket supporting mechanism above described to remove the irregularities in the gaskets, select them individually and feed them to a guideway leading to the turret wheel. In performing this operating step, it is desirable to retain the gaskets on the spindles 21, to release them one at a time, and to support the released gaskets until they are engaged by a swinging arm which conveys them to the guideway. The gasket selecting mechanism, shown more particularly in Figs. 12 to 19 of the drawings, is mounted on the same end of the machine with the gasket supporting mechanism, and is shown enclosed in a casing 101, suitably attached to the shelf member 27. The casing comprises a pair of end pieces 102, a pair of side portions 104, and a removable cover 105.

The power for the operation of this part of the machine is obtained through shaft 106, mounted in suitable bearings in the sides of the casing 101, and other bearings in the castings 29. The shaft extends completely through the casing 26, and has a gear 107 mounted thereon, which is operatively connected to the power shaft 57 through gear 62, on shaft 56, gear 61 and bevel gear 59, on shaft 60, and bevel gear 58. Like shaft 57, the shaft 106 is rotated continuously and rotates with it the four cams 108, 109, 110, and 111 thereon, which furnish the power for the mechanisms in the casing 101.

As stated heretofore the spindles 21 are positioned consecutively adjacent a selecting mechanism which removes individual gaskets therefrom. Preferably, before a spindle is positioned, it is placed in engagement with gear 52 which rotates it and moves the gaskets toward the end thereof. The gaskets are prevented from falling off the spindle by the members 112 and 114 adjacent the free end thereof (see Figs. 12 and 16). The member 114 is curved so that the supporting spindle 21 will be adjacent its edge when rotated around from the position shown in dotted lines at 115 to the position shown at 116, where the end of the supporting spindle 21 abuts against the blade 117, which acts as a stop to prevent the gaskets from moving off under the influence of the threads 24.

A roller 118, preferably knurled, is mounted on a small shaft 119 attached to the framework in any suitable manner as by means of a bracket 120. The coiled spring on the pin 119 and the weight of the roller cause it to press downwardly in a vertical direction against the gaskets on the knurled portion 25 of one of the spindles 21. A set screw 122 engages the frame work of the machine and prevents the roller from exerting an excessive pressure on the rubbers. While the rubbers are prevented from jumping off the spindles 21 by the blade 117, the roller 118 cooperates with the knurled portion 25 to roll the rubbers into their natural form and to remove any irregularities therein. It will be understood that by means of the set screw 22, the pressure on the gaskets may be decreased to any desired extent or the roller may be spaced from the spindle any desired distance, depending upon the pressure requirements. In some cases, it may be sufficient to have the roller 118 engage the gaskets without pressing them against the narrow portion of the spindle.

The lower edge of the blade 117 has a notch 124 adapted to fit over a pin 125 which extends through an aperture 126 in the side of the casing. The pin 125 normally is in position to catch any gasket which is dropped from the knurled portion 25 of one of the spindles 21. When it is desired to feed a gasket, the cam 109, on shaft 106, moves the pivoted lever 123, which in turn operates the connecting rod 127 to rotate a sleeve 128 upon which the knife 117 is mounted by means of an extension 129 (see Figs. 12, 13 and 19). A spring 130 attached to an extension 131 from the sleeve 128 tends to retain the blade in its lowest position over the pin 125. When actuated by the cam as described above, the free end of the knife moves upwardly and the gasket is pushed off of the knurled portion 25 and drops on the pin 125. Preferably, there is just sufficient space between the end of spindle 21 and the member 132 to allow a single gasket to move on to the pin 125. Cam 109 then operates to bring the blade 117 back to its normal position and the notch 124 permits the blade to descend sufficiently far to act as a stop for the other gaskets, and may at the same time press the released gasket against the pin 125.

At this point the cam 110, on shaft 106, operates to oscillate the pivoted lever 134 which is in engagement with a pin 135 held in position by a leaf spring 136. The pin 135 is attached to a lever 137 to form an L shaped member pivoted at 138, and has mounted on it the pin 125. Therefore, when the cam 110 oscillates the lever 134 and pin 135 against the spring 136 it likewise moves the pin 125 away from the supporting spindle 21, and permits the gasket supported thereon to drop as the pin recedes into the aperture 126. It will be seen that by means of the blade 117, the pin 125, and their associated mechanisms, gaskets which have previously had their irregularities removed are dropped one at a time from the end of one of the supporting spindles 21.

A swinging arm 140, having a pin 141, notched at 142, is retained in its normal position by a spring 144 to receive the gaskets dropped by the pin 125, so that they fall in the notch 142. The cam 108 actuates through lever 145, and connecting rod 143, the swinging arm 140 which is mounted on the shaft 147 supported in bearings 148 and 149, in the side of the casing and in the bracket 150, respectively. The pin 141 moves along the arcuate slot 151 in the side of the casing and carries the released gasket to the guideway 152. A piece of sheet metal 154 is mounted adjacent the guideway and extends over a portion of the arcuate slot with a handle 155 extending upwardly therefrom, see Fig. 16). The gasket is placed adjacent the sheet metal and at this point a blast of air is admitted through the tube 156 and nozzle 157 to drive the gasket along the slot. The sheet metal 154 is curved at 158 to facilitate the entry of the gasket into the guideway. In case the gasket should get caught at the entrance of the guideway, the handle 155 may be utilized to bend the sheet metal so that the gasket may be removed easily.

It will be noted that the lever 145, which actuates the swinging arm 140, may be considered as having a double pivot, that is, at 146, and at 159. In other words, the lever 145 may oscillate about the pivot 159 to move the rod 143, or if the movement of the swinging arm is obstructed, the lever 145 may break at its center pivot 146, and its lower end will remain at rest. The spring 160 renders the pivot 159 ineffective by retaining the short lever thereon against the stop 162, unless the swinging arm 140 encounters some obstacle which causes its resistance to movement to exceed a predetermined maximum.

Since the pin 141 projects through the arcuate slot 151 a considerable distance it is desirable as it reaches the lower part of the slot where the gasket is released to decrease the amount of the projection so that the gasket will drop off and the pin will not affect its entry into the guideway. Cam 111 on shaft 106 operates, through the cam roller 165, on a pivoted lever 164, connecting rod 166, sleeve 167, and finger 168, to oscillate the shaft 147 having the swinging arm mounted thereon. A spring 170 mounted between the bracket 150, and a collar 171, tends to keep the swinging arm in the position in which the pin 141 does not project through the arcuate slot 151. The cam 111 is so shaped that when the swinging arm is in its vertical position, the shaft 147 is moved in opposition to the spring 170 to position the pin sufficiently far through the arcuate slot 151 to receive the gasket about to be released. As the arm swings to deliver the gasket to the guideway, the cam 111 permits the shaft to move under the influence of the spring 170 so that the pin 141 does not project through the arcuate slot at the time the gasket reaches the guideway leading to the turret wheel. The slot 142 is preferably only on the upper surface of the pin 141 whereby when the swinging arm oscillates through an angle of about 60 degrees, the slot is on the side of the pin and ceases to be effective to hold the gasket thereon.

*Assembly turret and reciprocating plate*

In view of the fact that the gaskets after leaving the feeding mechanism enter an assembly turret where various operations are performed by mechanisms mounted upon a reciprocating plate which cooperates with the assembly turret, it is desirable to describe these parts of the machine at this time.

The assembly turret and reciprocating plate are shown more particularly in Figs. 3, 4, 5, 7, 21, 35, 36, and 37. The assembly turret 200 consists of a circular disc 201, having suitable gear teeth 202 on its outer periphery. A series of apertures 204 are formed adjacent the outer periphery of the disc and have their centers on the circumference of a circle whose center is the center of the disc. While the number of apertures may be varied without affecting the principles of the invention, there is shown in the preferred embodiment ten of said apertures. An aperture 205 (Fig. 35) is formed at the center of the disc for convenience in mounting the same upon the front of the machine.

A casting 206 forming the front of the machine has an aperture 207 formed at its center portion adapted to seat a hub 208 having a shoulder 209 thereon. A disc 210 having an aperture 211 at its center is adapted to fit over the small portion 212 of the hub 208 and abut against the shoulder 209. The hub 208 together with the disc 210 fit into the aperture in the casting 206, whereby the disc is held firmly against the casting by the shoulder 209. The assembly turret 200 fits over the large portion of the hub and abuts against the disc 210, which acts as a wear plate to prevent undue wear upon the casting 206, and also serves as a housing for certain members operative upon the gaskets and caps in the turret wheel, which will be described hereinafter. A circular ring 215 fits over the junction of the assembly turret and the hub and suitable bolts 216 extend through the inner portion of the ring and pierce the shoulder 209, plate 210, and casting 206, to hold the parts rigidly in position, the assembly turret being permitted to rotate about the shoulder in contact with the ring 215 and the disc 210.

In one corner of the casting 206, a bearing is formed to accommodate a shaft 218. A bracket 219 having a bearing 220 therein, is also secured to the casting 206 and adapted to accommodate the shaft 218, whereby it is supported at two points. A bevel gear 221 meshes with the bevel gear 222 of the main driving mechanism to rotate this shaft intermittently as will be described hereinafter. A gear 223 is mounted on the shaft 218 between the bracket 219 and the casting 206, and is adapted to mesh with the gear teeth 202 on the outer periphery of the assembly turret and thereby rotate the turret intermittently. The drive is such that the assembly turret is rotated at each step a distance equal to that between adjacent apertures, in other words, at each rotation the apertures succeed each other in position.

Suitable bearings 224 shown herein as four in number are formed in the hub 208 to accommodate four bolts 225, whose inner ends are attached to yoke 226, which is in turn attached to an eccentric 227, so that the bolts may be reciprocated. The outer ends of the bolts have mounted thereon a plate 228, which likewise reciprocates with the bolts. A series of members and mechanisms are mounted on the plate adjacent its periphery to enter the apertures 204 in the assembly turret when the plate is moved inwardly.

Since the parts associated with the turret wheel and the plate 228 are rigid, it is necessary that the apertures in the turret wheel be correctly positioned otherwise when the plate reciprocates inwardly to bring the mechanisms mounted thereon into the apertures they might come in contact with parts of the assembly turret and cause damage to the apparatus. To avoid this a plurality of small apertures 230 are correctly positioned adjacent the outer periphery of the turret wheel midway between the apertures 204. A suitable pin 231, (see Fig. 36) is mounted in the casting 206 and extends through the disc 210, and is adapted to enter the apertures 230, when the turret is in correct position to receive the mechanisms on the reciprocating plate. A spring 232, attached to the casting 206 and to a clutch lever 234, upon which the pin 231 is mounted, tends to move the clutch about its pivot 235 to press the pin 231 in position to lock the assembly turret. A cam 236, on shaft 237, is effective upon the cam roller 238 on the clutch lever to disengage the pin 231 from the turret wheel. The lever 234 when in the position shown in Fig. 36 disconnects the power from the eccentric which reciprocates the plate 228. However, when the pin 231 is in position to lock the turret wheel in its correct position by entering one of the apertures 230, the clutch member 234 is in ineffective position and permits the reciprocation of the plate 228.

*Gasket positioning mechanism*

After the gaskets have been singled out and fed individually to the guideway leading to the turret wheel, the gasket positioning mechanism positions them correctly in successive apertures in the turret wheel heretofore described. A preferred embodiment of this mechanism is illustrated more particularly in Figs. 7, 16, 20, 21. The guideway 152 is formed preferably of a sheet metal plate 301 extending from the inner hub of the turret wheel to the gasket selecting mechanism and is secured to the framework by bolts 302 and separated therefrom by the strips 304 at the respective sides thereof. A longitudinal slot 305 extends along the central portion of the plate 301 so that the gaskets 22 may be seen as they move along the guideway and in case they lodge in the guideway, they may be readily removed. Preferably the guideway is as short as possible so that the extent of travel of the gaskets in the guideway may be reduced to a minimum and if desirable, the guideway may be canted to the horizontal to facilitate the movement of gaskets therethrough.

The lower one of the strips 304 extends over the periphery of the turret wheel and the end of the guideway 152 is formed by the plate 307 held in position under the strip of sheet metal 301 with its end adjacent an aperture 204 in the turret wheel, shaped to fit about and to form an axial continuation of one side thereof. A pin 310 is mounted on the upper part of the plate 301 adjacent the position where the respective apertures 204 stop and a sleeve 311 mounted thereon carries a curved member 312. (See Fig. 7.) The sleeve 311 is attached to a lever 314 which is in turn attached to a second lever 315 rigidly mounted on shaft 316 extending through the framework of the machine and having a lever 318 with a cam roller 319 thereon engaging a cam 320 on shaft 321.

The rotation of the shaft 321 oscillates the curved member 312 from a horizontal position to a substantially vertical position whereby a gasket may enter the end of the guideway while it is in the horizontal position and be held above one of the apertures 204 by the curved member 312 and the plate 307 which form substantially a continuation of the side wall of an aperture while the curved member is in its vertical position.

In order to correctly position the respective gaskets in the apertures 204 a pair of pistons 324 and 325 move from opposite sides of the turret wheel into the apertures as they stop under the plate 301 to remove the gaskets from between the curved member 312 and the plate 307, in the guideway 152, into the apertures. The piston 324 is mounted upon a piston rod 326 having a spring 327 mounted to press against the bracket 328 to force the piston resiliently toward one of the apertures 204. A lever 330 pivotally mounted at 331 has a cam roller 332 adapted to engage the cam 334 on one side of the pivot to oscillate the lever 330 and to move the piston 324 out of the apertures 204. The attachment of the end of the lever 330 to the piston rod 326 is such that a slidable movement is permitted therebetween so that the movement of the piston toward the turret wheel will always be by the spring 327, the cam 334 determining the extent of movement of the piston under the influence of the spring.

The piston 325 is connected through the piston rod 337 to one end of a lever 338 which is pivotally mounted on a bolt 339 extending through the center of the hub 208. The other end of the lever engages a pin 340 slidably mounted in the hub which is actuated by an L shaped lever 343 pivoted at 341 carrying a cam roller 342 in engagement with the cam 344 on the shaft 321 to oscillate the lever in opposition to spring 345.

The operations of the shafts 237 and 321 and the cams thereon are so timed with respect to each other that the two pistons 324 and 325 move toward each other substantially simultaneously and engage a gasket 22 therebetween and position it within an aperture 204 whereupon the pistons move apart into their respective seats 346 and 347 permitting the turret wheel to rotate one step to bring another aperture in position. The gaskets are held in position over the aperture ready for the action of the two pistons by means of the curved member 312 operated by the cam 320.

Cap feeding mechanism

The gaskets having been fed to and positioned in the apertures in the turret wheel it is desirable to feed and position caps likewise in the apertures so that a suitable mandrel may be inserted in the apertures to assemble the caps and gaskets. Obviously, if caps are fed to apertures in which, for any reason, there is no gasket the caps will have to be removed or else they will go through the machine without a gasket. The present invention contemplates feeding caps only to the apertures having gaskets therein. A preferred embodiment of the mechanism for this purpose is shown more particularly in Figures 3, 5, 7, 22, 23 and 24.

A bin 401 is formed on top of the machine where caps may be stored in quantities to be fed to the machine. A guideway 402 extends from one corner of the bin in a downward direction to the turret wheel. It is formed preferably by suitable strips 405 spaced from the framework of the machine by the narrow strips 406 so that the caps when placed therein will roll on their edges under the influence of gravity to the turret wheel. Preferably, the strips do not meet across the center of the caps, but have a substantial opening so that the caps which fit loosely in the guideway may be removed if the operator should inadvertently insert a cap with the cover portion facing the assembling mandrel.

At some point intermediate the ends of the guideway and preferably near the turret wheel, a pivoted member 407 is inserted through the bottom of the guideway and has a V shaped end adapted to fit around the edge of a cap 408. When oscillated so that the leg 409 of the V is projected into the guideway, it permits a cap to roll down upon the member and remain in that position. When the member is oscillated so that the leg 409 is removed from the guideway, the leg 410 holds the series of caps on the upstream side of the member, while one cap is permitted to proceed along the guideway to the turret wheel. When oscillated back to its original position, a second cap rolls upon the member and stops against the leg 409 and thus the cycle is repeated. A spring 412 secured at one end to the framework and at its other end to the member 407, pivoted at 414, retains the cam roller 416 in engagement with the cam 415 on shaft 237 so that the member 407 oscillates once during each revolution of the shaft 237 and thereby feeds a cap to the turret wheel during each of its stop periods. An air pipe 418 having a nozzle 413 adjacent the lower end of the guideway emits a blast of air which expedites the movement of the caps to the turret after their release by the member 407.

In certain instances, the gasket feeding mechanism fails to feed gaskets to some of the apertures and these apertures like the rest are stepped around to the cap feeding station and it is desirable to prevent the feeding of caps to these empty apertures. Accordingly, an automatic device 417 is placed so that the apertures pass it just before reaching the cap feeding station and it is adapted to prevent the feeding of a cap to an empty aperture. The details of the device are shown more particularly in Figs. 22, 23 and 24, wherein a bracket 419 is bolted to the framework of the machine and has mounted thereon an arm 420 extending over an aperture in the turret wheel, with a sleeve 421 rigidly mounted therein and having associated with it a second sleeve 422. A pin 424 extends through these two sleeves and is rotatably mounted therein. An arm 425 on the sleeve 422 carries a cam roller 426 adapted to be engaged by the reciprocating plate 228 to rotate the sleeve 422 and also the arm 427 through spring 428 toward the gasket 22 in one of the apertures 204. A lever 429 is pivoted at the end of the arm 427 and has an aperture 431 adapted to receive a pin 432 on the arm 427 to hold the lever within predetermined positions. Another pin 434 on the end of the pivoted lever 429 is adapted to engage an arm 435 rigidly mounted on the spindle 424 to rotate same. The arm 425 is resiliently held in its outward position by a spring 436 attached to the stop 437 and the pin 438. Its outward position is determined by the engagement of the arm 429 with the stop 437 mounted on the bracket 419.

Figure 22:
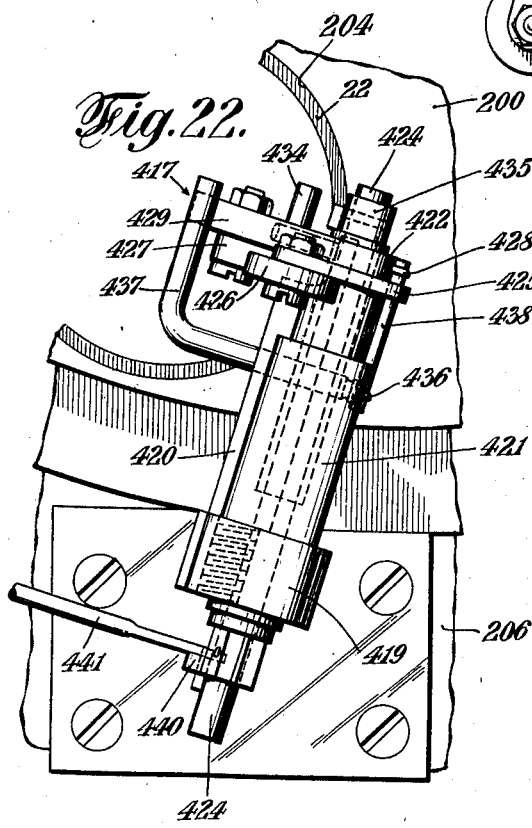
Fig. 22 is a side elevational view of the control device for the automatic feeding mechanism shown in Figs. 3 and 7.
Figure 24:
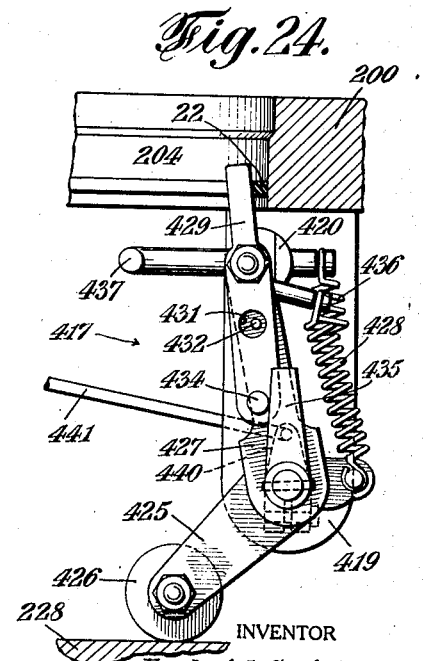

When the reciprocating plate 228 moves toward the turret wheel to permit the various devices thereon to perform their respective operations, it engages the cam roller 426 and moves the lever 429 into engagement with the gasket 22 through arm 425, spring 428 and arm 427 as shown in Fig. 24. The pin 434 engages the arm 435 and rotates the spindle 424 together with the arm 440 thereon which is connected by a rod 441 to an L shaped member 442 pivoted to the framework at 444. When the spindle 424 is rotated by the contact of the lever 429 with a gasket as shown in Fig. 22, the rod 441 is pulled toward the gasket end of the machine and as a result, the L shaped member 442 is rocked so that the pin 445 on the end thereof is pulled out of engagement with a pin 446 (Figs. 2 and 3) on the end of the pivoted member 407 thereby permitting the cam roller 416 to follow the surface of the cam 415 to oscillate the feeding member to feed caps to the apertures in the machine. Should there be no gasket in one of the apertures 204, the lever 429 will not bring the pin 434 in contact with the arm 435 and as a result the rod 441 will not be moved, and in that case, the pin 446 will be left in engagement with the pin 445, and the pivoted feeding member will be held in opposition to the spring 412, and the cam roller 416 thereon will cease to engage the cam 415 and no cap will be fed to the aperture when it is moved up to the end of the guideway. In this way, caps are fed consecutively only to those apertures having gaskets therein.

A counting device 450 of any known type may be mounted in the framework of the machine by the bolts 451 and connected to the pivoted feeding member 407 through the arm 452, rod 454 and sleeve 455 on spindle 456 to count the number of oscillations of the pivoted member 407 and thereby record the number of caps passing through the machine, and since the caps fed are discharged from the machine with gaskets therein, the device also records the number of assembled caps and gaskets leaving the machine.

Cap positioning mechanism

After the caps are released by the feeding mechanism to permit them to proceed along the guideway to the end thereof, it is desirable to position the caps in the apertures 204 of the turret wheel. The mechanism for doing this is shown more particularly in Figs. 7, 25, 26, and 37. The guideway 402 extends laterally through the plate 210 back of the turret wheel to a position adjacent the apertures in the turret wheel. The end of the guideway is shaped to form substantially a continuation of one side of the apertures 204 as they stop in their respective positions. Seated back of the cap at the end of the guideway in the plate 210 and casting 206 is a piston 501 on a piston rod 502 slidably mounted in the bearing 504 in the casting 206 and in a bearing 505 in the bracket 506 secured to the framework of the machine. An L shaped lever 508 is attached to the piston rod at one end and is pivoted to the framework at 510 with a cam roller 511 mounted on its other end in engagement with the cam 512 on shaft 237. The cam 512 through its lever operates the piston 501 in opposition to the spring 515, the amount of pressure applied to the cap being controlled by the size of the spring. The distance the piston moves inwardly is controlled by the lever 508 and the cam 512.

Another piston 518 is positioned on the other side of the turret wheel and is mounted on the reciprocating plate 228 by means of the bushing 519 and piston rod 520. The piston is moved inwardly to cooperate with the piston 501 by the inward movement of the plate 228 through the intermediation of the spring 521 on the piston rod 520, nuts 522 permit the adjustment of the length of the piston rod to regulate its operation.

When the turret wheel has stopped with an aperture adjacent a cap in the end of the guideway, the pistons 501 and 518 move toward each other actuated by the cam 512 and plate 228, respectively. The pistons engage the cap therebetween and force it to an upright position and, the spring 515, being stronger than spring 521, the piston 501 presses the cap firmly against the shoulder 524 in an aperture 204.

Figures 26, 34:
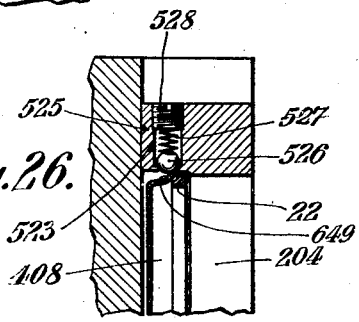
Fig. 26 is a sectional view along line 26—26 of Fig. 7 showing the cap holding means.
Fig. 34 is a detailed sectional view along line 34—34 of Fig. 5, showing the cap retaining member.
Figures 12, 13:
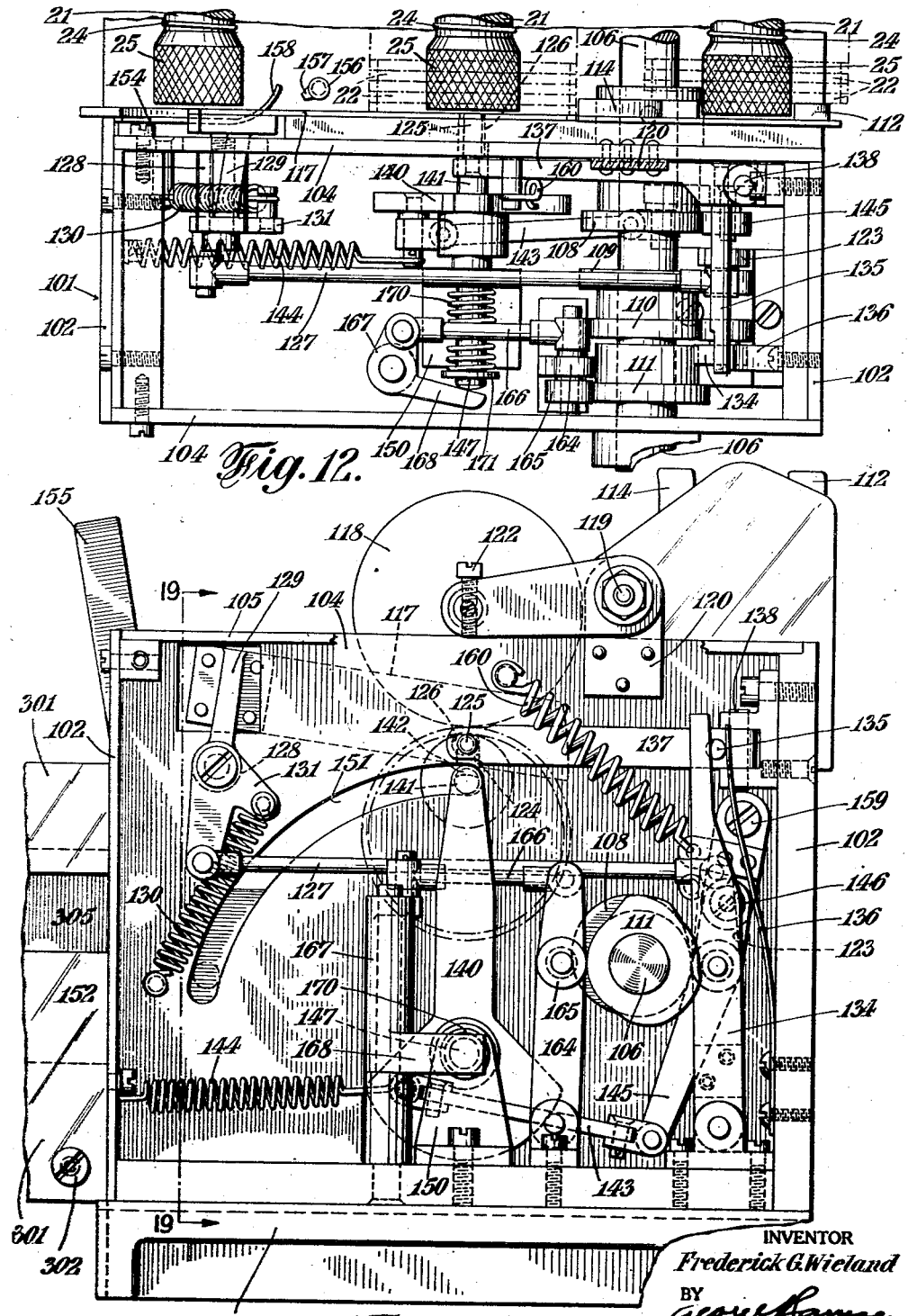
Fig. 12 is a top plan view of the gasket feeding mechanism with cover removed.
Fig. 13 is a side elevational view of the gasket feeding mechanism with the side of the casing removed.
Figure 20:
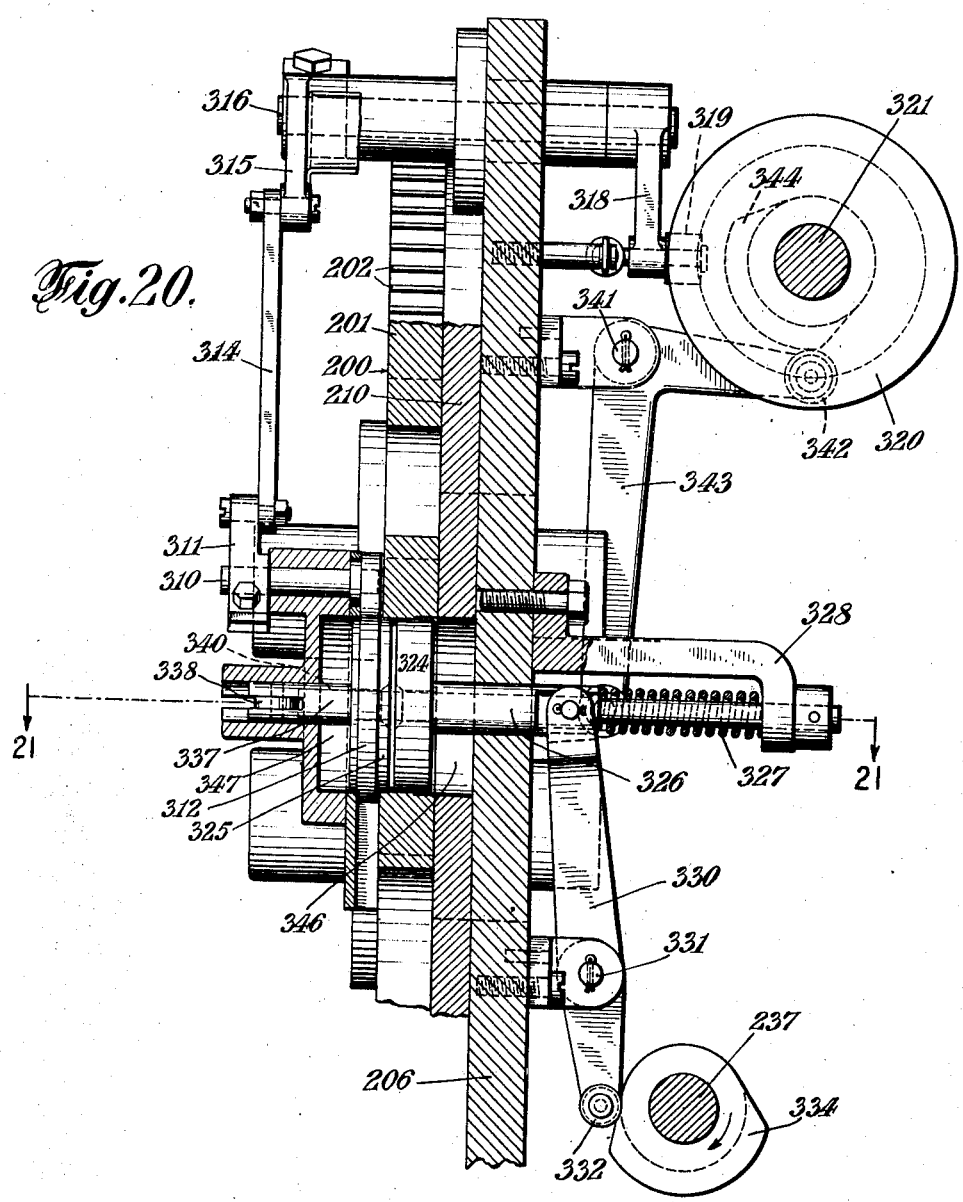
Fig. 20 is a detailed sectional view of the mechanism for positioning the gaskets within the apertures of the turret wheel.
Figure 21:
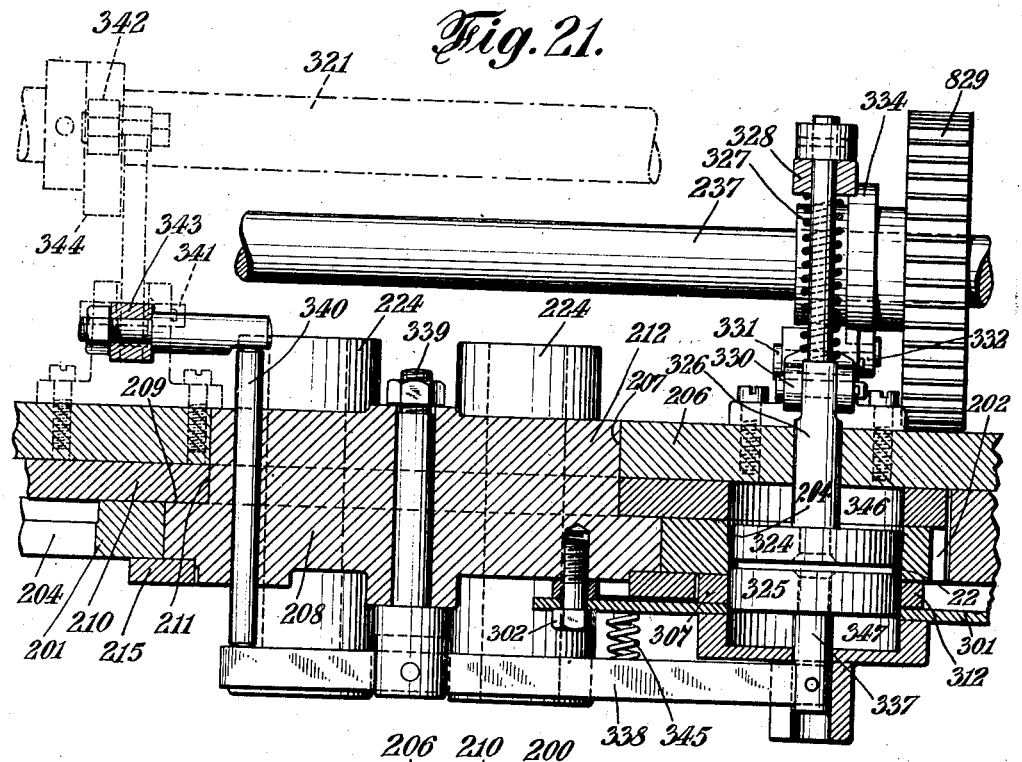
Fig. 21 is a sectional view along line 21—21 of Fig. 20.

The cap is automatically engaged upon its entry into an aperture and held in upright position against the shoulder therein by the holding means 525 which comprises a ball 526 seated in an aperture 523, extending through the periphery of the turret wheel to the aperture 204, and held in position by a spring 527 retained in the aperture by a screw 528 as shown in Fig. 26. The length of the piston rod 520 is adjusted by means of the nuts 522 so that the piston 518 disengages the cap prior to the disengagement of the piston 501 to permit the latter to press the cap firmly against the shoulder 524. It will be noted that the piston 518 is sufficiently small to enter the apertures without disturbing the gaskets 22 therein. The turret wheel upon removal of the piston moves the cap and gasket a step forward and brings in position another aperture for the insertion of a cap therein, and so the cycle is repeated.

Assembling mechanism

The feeding of the gaskets individually to one side of the turret wheel and the insertion of the gaskets in apertures which are carried by step by step movement to the other side of the turret wheel where caps are fed and positioned adjacent the gaskets and in a plane parallel thereto has been described hereinbefore. The next step in the operation of the machine is the insertion of the gaskets within the beads of the caps. The preferred embodiment of the mechanism for this purpose comprises generally a mandrel of a diameter smaller than the gasket with a pair of fingers diametrically opposed which normally set out a distance greater than the outside diameter of the gasket so that when the mandrel moves into an opening in the assembly wheel, it goes into the gasket and the fingers go over the gasket. Thereafter, the fingers close drawing the gasket down on the mandrel by making two inward diametrically opposed kinks in the gasket. The contracted diameter of the gasket is then less than the internal diameter of the cap with which it is to be assembled. As the mandrel moves further into the aperture, it engages the cover of the cap with the skirt thereof extending over the end of the mandrel. At this time, the fingers release the gasket which assumes its natural shape in the bead of the cap and the assembly is complete.

The mechanism for performing these operations is more particularly shown in Figs. 3, 5, 6, 7, 27, 28, 29, 30, 31, 32, 33, and 37. Referring more particularly to Figures 27 to 33 inclusive and 37, it will be seen that the mandrel 601 comprises a main body portion 602 whose upper end extends through the reciprocating plate 228 and is secured thereto by the nuts 604. Mounted upon the upper end of the body portion is a bushing 605 also extending through the reciprocating plate 228 and secured thereto by the bolts 606. The lower end of the bushing is cup shaped to permit a limited longitudinal movement of the body portion therein. The springs 607 mounted in suitable apertures in the body portion and contacting with the bottom of the cup maintain the body portion in its outward position, that is, in the position where the nuts 604 are pressed firmly against the bushing. The purpose of this resilient connection is that slight variations in the adjustment of the mandrel with respect to the plate 228 may be taken care of by the springs 607, thereby eliminating any danger of the end of the mandrel being damaged by engagement with the plate 210 against which the caps rest.

As will be described hereinafter, it is necessary to cut away certain parts of the body portion, and to facilitate the cutting operation a cover 609 is mounted at the lower end of the body portion and attached by suitable bolts 610 to the mandrel. A pair of slots 612 are cut into the central part of the body portion to accommodate the fingers 614 which are mounted on suitable pins 615 extending across the slots. The upper end of the body part adjacent the pins is slotted transversely to accommodate extensions 616 from the fingers terminating at the center portion of the mandrel. A member 618 is seated in the upper part of the body portion and adapted to slide axially thereof and is held in its outward position by the spring 619. A pair of transverse slots 620 in the member permit the extensions 616 to be operatively engaged and the fingers are oscillated about the pins 615 by the movement of this member. A lever 622 extending from the outside of the mandrel into the slot 624 in the side thereof passes through the member 618 and is adapted to reciprocate it in opposition to the spring 619 to move the fingers inwardly and outwardly with respect to the mandrel. The lever 622 is pivoted to the bolt 625 extending through the casting 206 and is operated by the cam 627, on shaft 321, through cam roller 628, and cam lever 629, pivoted at 630 and attached at its other end to the adjustable rod 631 secured to the lever 622. It will be seen that the shape of the cam 627 is such that at one point during each revolution of the shaft 321 the lever 622 is moved toward the reciprocating plate 228 and the member 618 is pressed against the spring 619 to pull the fingers 614 inwardly to form the two diametrically opposed kinks in the gasket, shown in Fig. 33, so that its diameter will be less than that of the skirt of the cap. It is to be understood that the showing of a mechanism for forming two loops in the gasket is illustrative and, if desired, one or any number of loops may be utilized.

The fingers 614 are slotted at 635 to accommodate a pair of slidable members 636. A metallic plate 637 is secured over the slot by screws 639; and the springs 640, seated in apertures 641 in the members 636, retain the members in their outward position. The lower ends of the fingers 614 and the movable members 636 are cut away to form the slots 644 adjacent the end of the mandrel to receive the gasket, as it moves over the end of the mandrel, for the purpose of forming two diametrically opposed kinks therein by the inward movement of the fingers.

In assembling a cap and a gasket, the reciprocating plate 228 moves inwardly and the mandrel 601 is inserted into an aperture 204 with the movable members 636 on the fingers 614 passing into the slots 646 in the periphery of the apertures 204. As the mandrel moves further into an aperture, the gasket therein encompasses the end of the mandrel and engages the fingers 614 and slots 644. At this point, the cam 627 operates the lever 622 which moves the outer ends of the fingers toward each other and forms a pair of diametrically opposed kinks in the gasket drawing it tightly around the end of the mandrel as shown in Figs. 31 and 33. As the mandrel passes further into the aperture and substantially at the time when the cover portion of the cap is pressed against the plate 210, the cam 627 returns the lever 622 bringing fingers 614 to their former position and causing the movable members 636 to engage the skirt of the cap. The ends of the members 636 are bevelled to form cam surfaces 648 which when pressed against the skirt of the cap cause the movable members 636 to move away from the gasket as shown in Fig. 32, eventually releasing it so that it springs outwardly into the bead 649 of the cap because of its own elasticity. The cover portion 609 over the end of the mandrel is preferably of substantially the same thickness as the length of the skirt of the cap above the bead so that the gasket extending around the mandrel above this corner portion will be directly adjacent the bead of the cap and ready to enter therein when released by the movable members 636. The reciprocating member 228 returns the mandrel to its original position and the assembled cap and gasket remains in the aperture 204 and is stepped around to another position and another aperture replaces it having a cap and gasket therein to be operated upon by the assembling mandrel.

Discharge mechanisms

While several types of caps may be advantageously used with the present machine, the particular caps generally used in this class of work are adapted to be stacked one upon another and packed in casings with gaskets and caps assembled. It is therefore desirable that the assembled caps in the turret wheel be delivered in a manner which will facilitate counting and shipping as much as possible. The mechanism for this purpose is more particularly shown in Figs. 5, 6, 34, 35 and 37.

A trough 701 extends through the upper part of the machine and communicates with the turret wheel so that an assembled cap and gasket is placed in front of it at each step of the wheel. A piston 702 attached to the reciprocating plate 228 by the rod 704 and nut 705 is adapted upon the inward movement of the reciprocating plate to enter an aperture 204 in front of the trough 701, and press the cap on to the trough. Mounted above the trough on the disc 210 is a leaf spring 707 having a pin 708 mounted at its outer end adapted to pass through an aperture 709 in the periphery of the disc 210 to engage the cap which has been removed from the aperture of the turret wheel on to the trough and prevent its return as shown in Fig. 34. As the machine continues to operate each cap pressed on to the trough moves the line of caps further along until eventually it extends outside of the machine as shown at 710. The caps are then ready to be removed in stacked relation and placed in cases.

Figure 6:
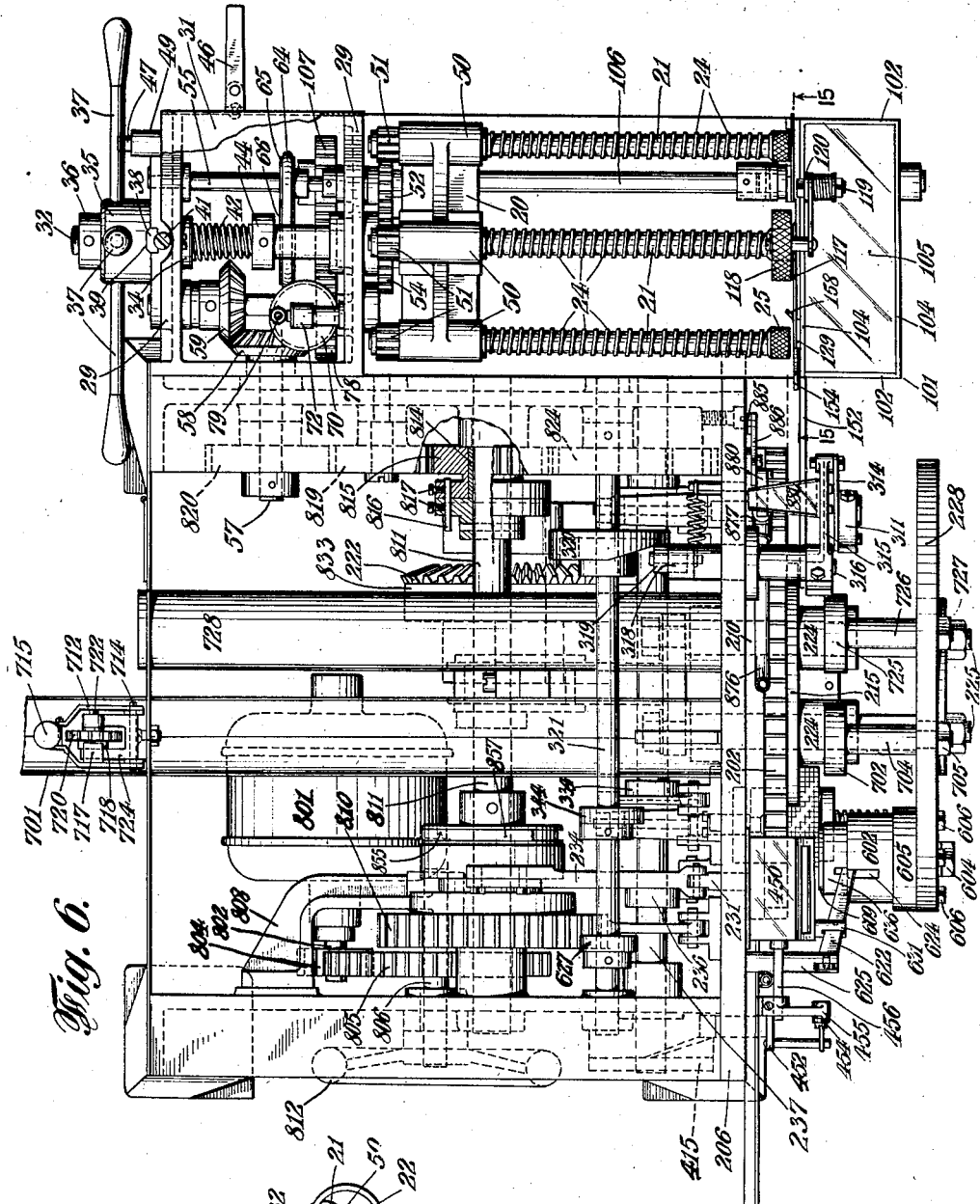
Fig. 6 is a top plan view of the machine with the cover removed to show the internal construction thereof.
Figure 15:
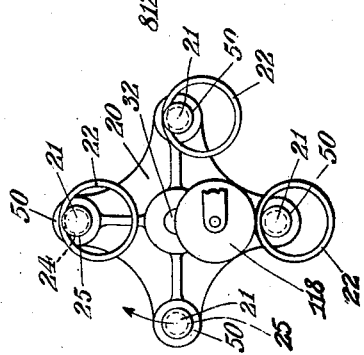
Fig. 15 is a sectional view along line 15—15 of Fig. 6.

Prior to packing, however, it is desirable to count the caps. To facilitate this work, a counting mechanism shown in Figs. 6 and 38 is mounted on the back of the machine and comprises generally a pair of arms 712 pivotally mounted on the frame of the machine at 714 and carrying between their outer ends a marker 713 adapted to be filled with ink or the like by removing its cover 715. The point 716 of the marker is supported just out of contact with the caps by means of the bracket 717 bolted to the arm 712 and resting upon a cam 718. A gear 720 integral with the cam 718 and mounted on the pin 722 extending between a pair of arms 724 rigidly mounted on the framework of the machine has gear teeth 721 adapted to engage the peripheries of the respective caps moving thereon and to rotate the cam accordingly. A notch at one point in the cam surface 718 permits the marker to drop down once during each revolution of the cam and mark a cap.

The number of gear teeth or the number of notches in the cam may be varied to cause a marker to engage every 20th, 30th or 50th cap as desired. This enables the packer to pick up a stack of caps corresponding to the stacks of caps to be placed in the cases. In this manner, the packing of the caps is greatly facilitated.

In certain instances, the caps may become caught in the guideway or for some other reason a cap may not be fed to an aperture containing a gasket; in that case the gasket moves around with the turret wheel and is not materially affected by any of the mechanisms including the cap discharging mechanism until it reaches a station one beyond the cap removing station. At this point, a piston 725 is mounted on the reciprocating plate 228 by the rod 726 and nut 727. The piston is adapted to enter an aperture 204 on the inward movement of the reciprocating plate to remove therefrom any gaskets which have not been assembled. A cylindrical pipe 728 extends through the machine substantially parallel to the trough 701 and adjacent thereto and communicates with an aperture 204 in the turret wheel at a point adjacent the piston 725 and receives the gaskets which are removed from the turret wheel. These gaskets like the assembled caps and gaskets are pressed along the pipe as they increase in number until they reach the end extending through the back of the machine at which time the operator can remove a substantial number of the gaskets therefrom and place them on the spindles 21 and feed them through the machine again. The piston 725 is substantially the size of an aperture 204 and removes anything remaining in the apertures so that they approach the gasket positioning mechanism in condition to begin a new cycle.

Driving mechanism

The driving mechanism is for convenience enclosed within the framework to eliminate any danger to operators and to prevent any injury to the parts by the dropping of tools or the like therein. It comprises generally three main shafts, one of which operates an eccentric which reciprocates the plate 228 and in addition drives the other two main shafts; one of these driven shafts has three cams thereon connected respectively to the swinging arm for placing gaskets in front of the apertures in the turret wheel, to the gasket positioning mechanism, and to the assembling mandrel. The other driven shaft has four cams thereon connected respectively to the gasket positioning mechanism, the cap positioning mechanism, the automatic clutch, and the automatic cap feeding mechanism and also drives a geneva which rotates the assembly turret intermittently. These mechanisms are shown more particularly in Figs. 4, 5, 6 and 35.

Preferably, the machine is self-contained and driven electrically by a motor 801 mounted on the bottom of the framework of the machine having a motor shaft 802 with a gear 804 meshing with a gear 805 on shaft 806. The shaft 806 is mounted at one end in the framework of the machine and at the other end in a bearing in bracket 808 and carries another gear 809 which meshes with gear 810 on the main drive shaft 811. The shaft 806 extends externally of the framework of the machine and has mounted thereon a hand wheel 812 by means of which, through gears 809 and 810, the entire mechanism of the machine may be rotated manually for adjustment.

The shaft 811 extends from the cap feeding end of the machine to the gasket feeding end and has a bushing 814 mounted adjacent the gasket feeding end of the machine carrying a gear 815 loosely mounted thereon and connected to the shaft through a shearing pin 816 held in position by screws 817. All the mechanisms with the exception of the reciprocating plate are driven through the gear 815 and shearing pin 816 and in case the power required for the operation of the machine exceeds a predetermined maximum, the shearing pin breaks and the machine is shut down. This takes care of any gripping of parts or other contingencies. The gear 815 is connected to the gasket feeding mechanism through idling gear 819 and gear 820 on shaft 57. The shaft 57 is operatively connected to drive the gasket positioning and gasket selecting mechanisms as described hereinbefore.

The gear 815 drives the shaft 321 continuously through the idling gear 822 and gear 824, on shaft 321. The cam 320 is mounted on this shaft and oscillates the swinging arm 312, which enters the gasket guideway to position individual gaskets in front of the apertures 204 in readiness for the positioning mechanism. A second cam 344 on shaft 321 operates through the L-shaped cam 343, pin 340, and pivoted lever 338 the piston 325 of the gasket positioning mechanism as described hereinbefore with reference to Fig. 20 and a third cam 627 operates the pair of fingers 614 of the assembling mandrel through lever 622, rod 631 and the L-shaped lever 629 pivoted at 630, (see Fig. 27).

Figure 7:
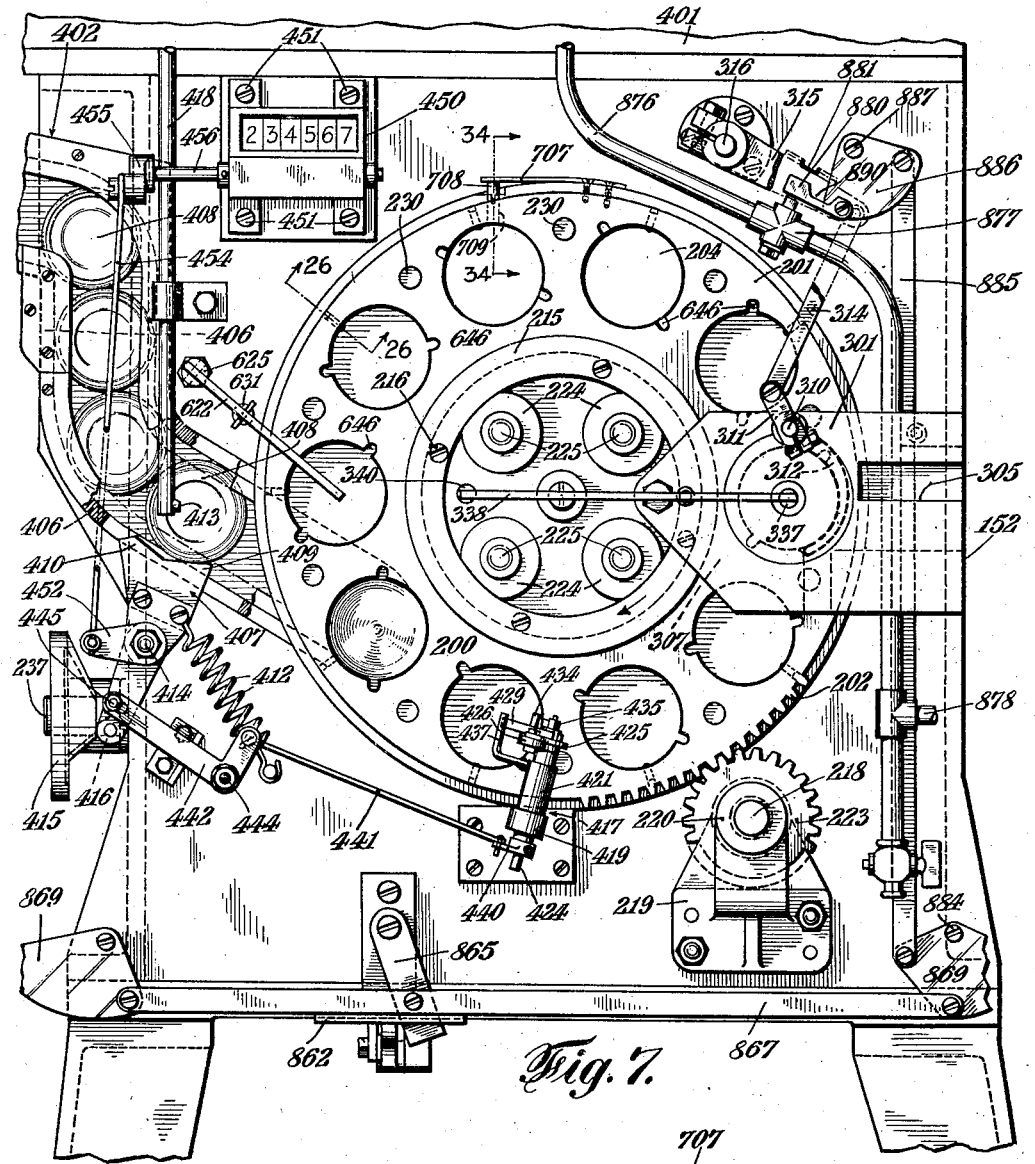
Fig. 7 is a detailed elevational view of the machine with certain parts removed to show the turret wheel and its asssociated mechanisms.
Figure 25:
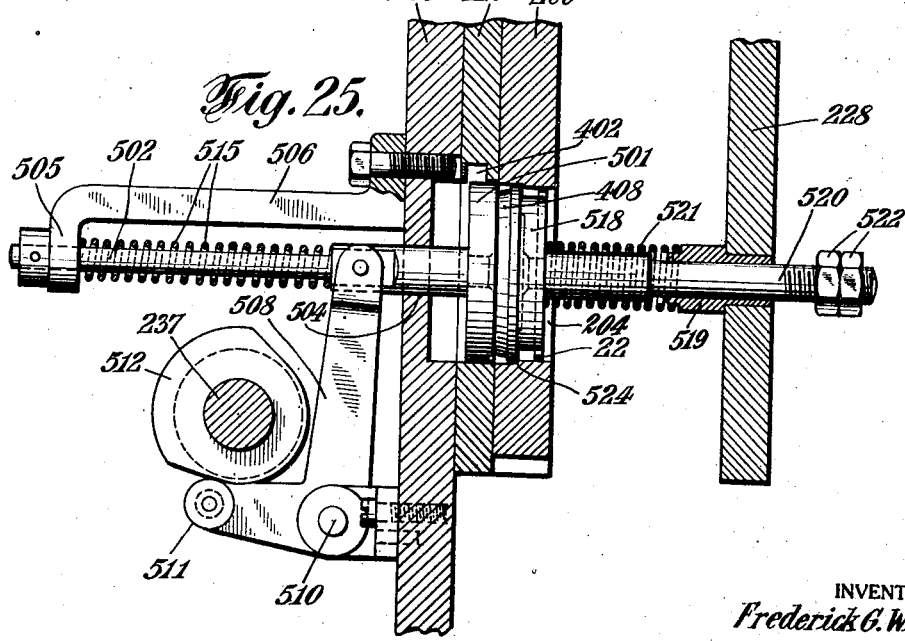
Fig. 25 is a cross sectional view of the cap positioning mechanism.
Figure 23:
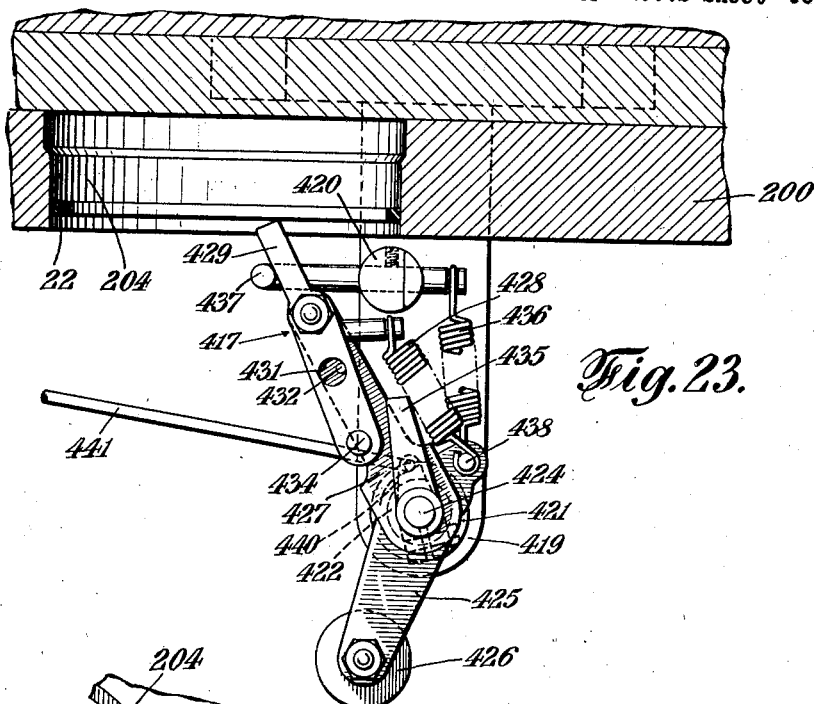
Figs. 23 and 24 are detailed elevational views of the control device in two positions.

The shaft 237 is substantially parallel to the shaft 321 and also mounted in bearings at the ends of the machine and is operatively connected to the main drive gear 815 through the idling gear 828, and gear 829 on shaft 237. A series of cams 334, 512, 236, and 415 are mounted on the shaft to actuate certain parts of the machine. The cam 334 operates through pivoted lever 330 and rod 326 to properly time and actuate the piston 324 which cooperates with piston 325 to position gaskets in the apertures 204 of the turret wheel as shown more particularly in Figs. 20 and 21. The cam 512 mounted adjacent cam 334 on shaft 237 operates the cap positioning piston 501 through the pivoted L shaped cam lever 508 and piston rod 502 to position caps against the shoulders 504 in the apertures of the turret wheel as shown in Fig. 25. The cam 236 oscillates the pivoted lever 234 to remove the pin 331 from the apertures 230 in the turret wheel thereby permitting it to rotate intermittently, (see Fig. 36). The cam 415 also on shaft 237 oscillates the pivoted member 407 to feed caps automatically to the turret wheel as shown in Fig. 7. As described hereinbefore, the cam reciprocates the member 407 once during each revolution of the shaft 237 unless prevented from doing so by the automatic feeding mechanism which retains the cam roller out of contact with the cam and prevents the member from releasing a cap when there is no gasket in an aperture 204 to which a cap is to be fed.

Figure 4:
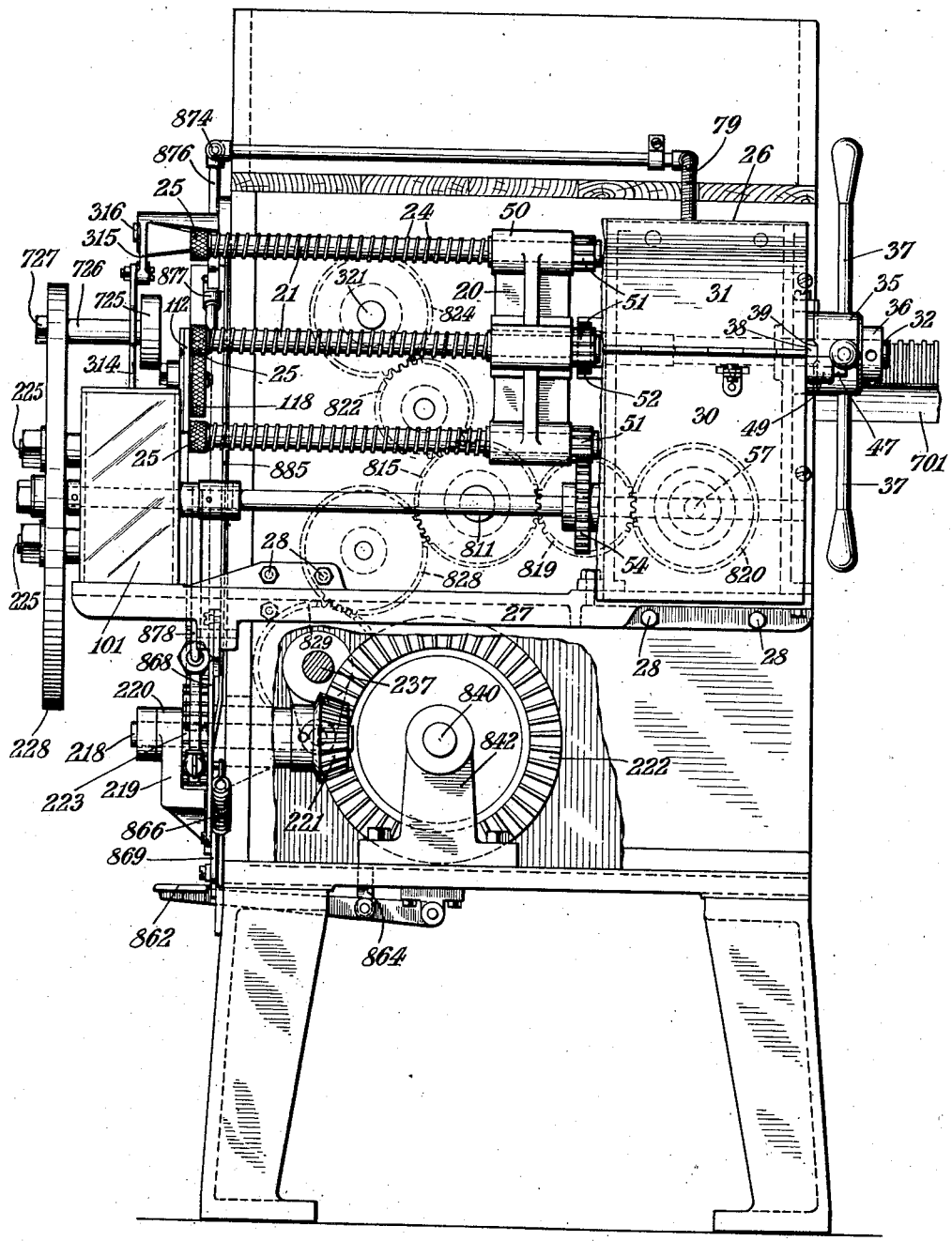
Fig. 4 is an end elevational view taken from the gasket feeding end of the machine with certain parts broken away to show portions of the internal construction.
Figure 5:
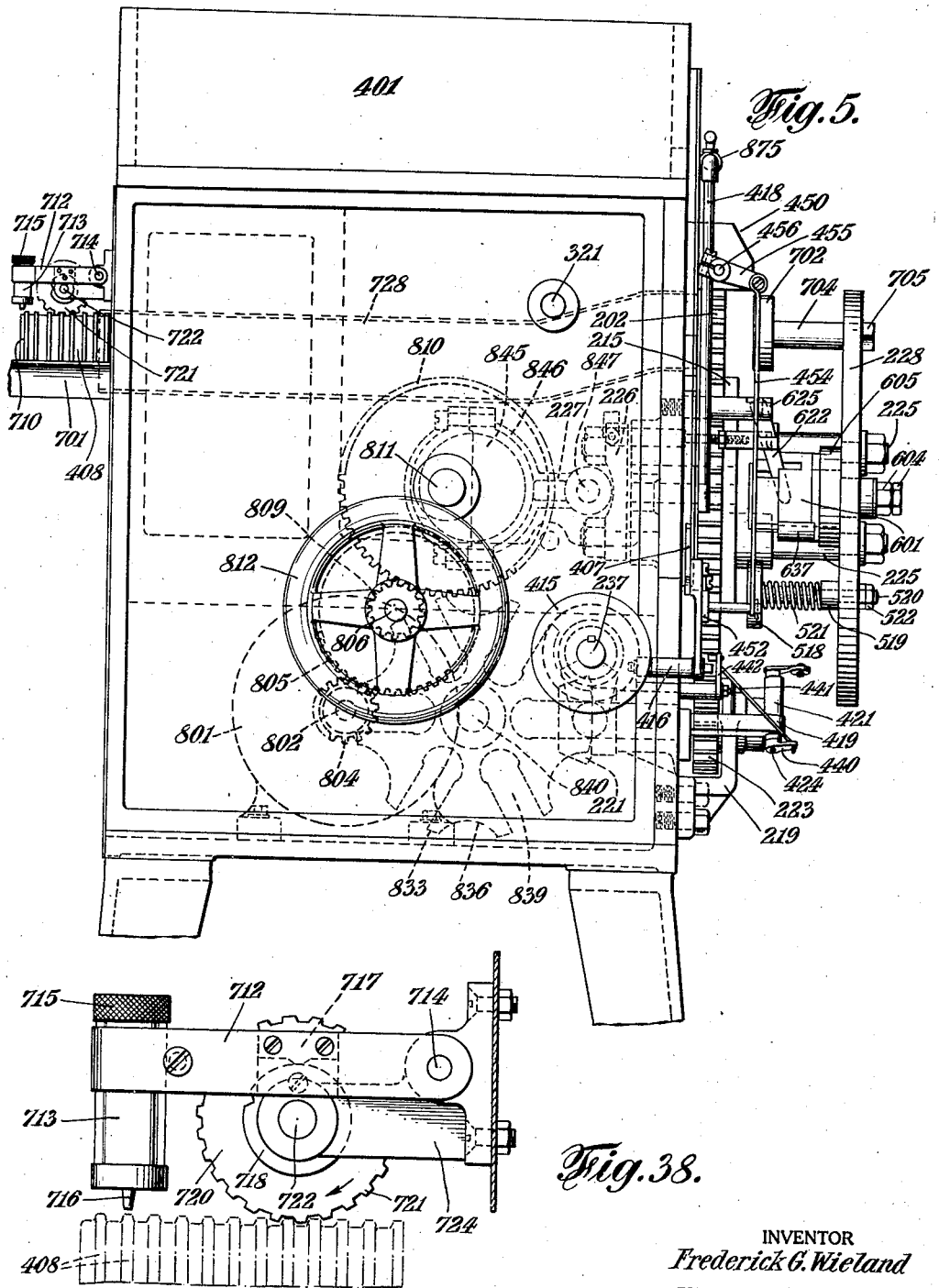
Fig. 5 is an end elevational view of the machine taken from the cap feeding end.
Figure 35:
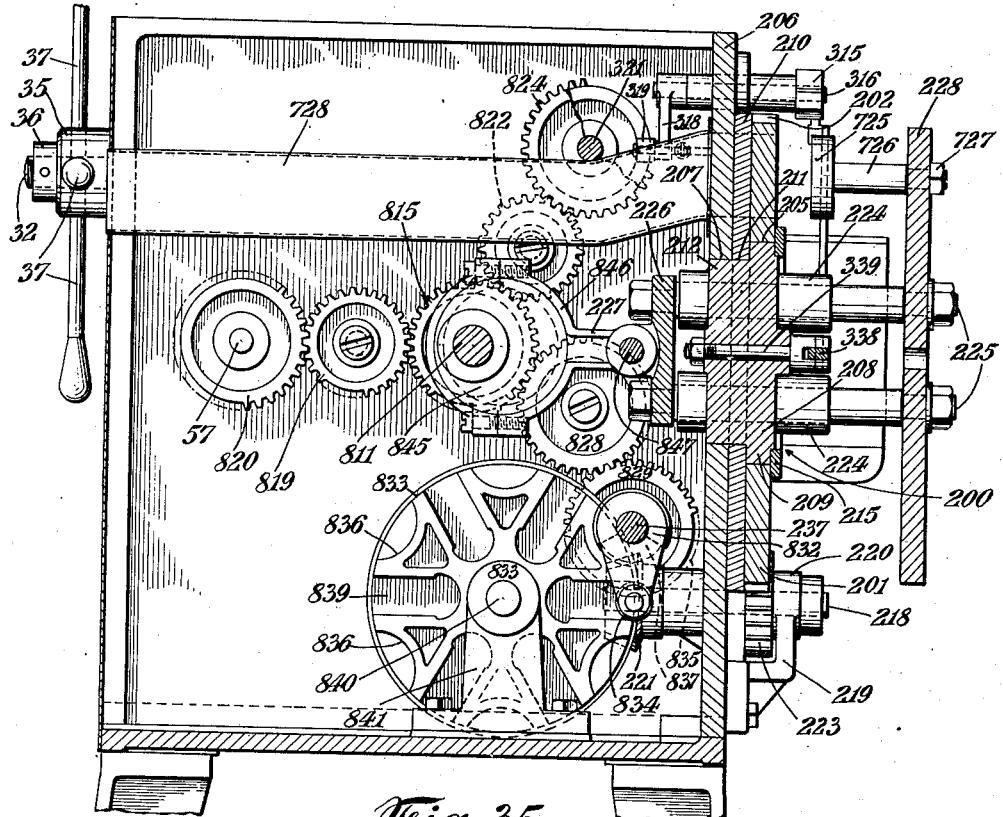
Fig. 35 is a vertical sectional view through the machine at the center of the turret wheel.
Figure 37:
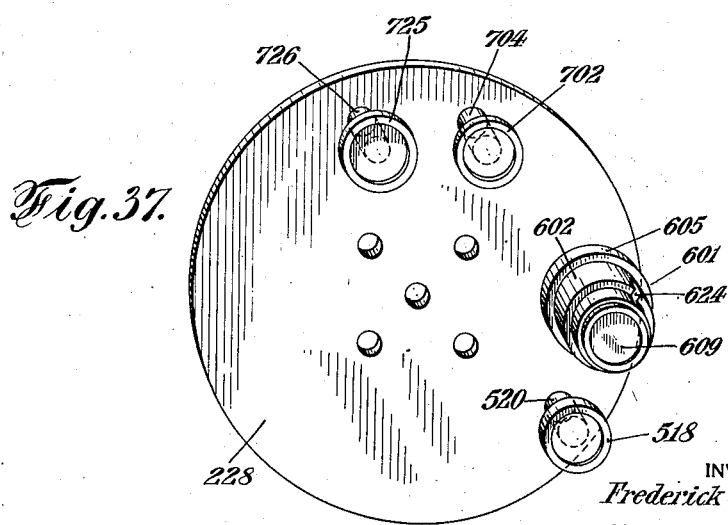
Fig. 37 is a perspective view of the disc mounted adjacent the turret wheel.

The shaft 237 also carries at the end adjacent the gasket feeding end of the machine an actuating member 832 of a Geneva movement with a cam roller 834 thereon and a dwell cam 835 adjacent the actuating member (see Figs. 4 and 35). The driven member of the Geneva movement is provided with a curved cam surface 836 adapted to be engaged by the dwell cam 835 to retain the driven member accurately in position for a predetermined period during which time the cam roller is not in engagement with the driven member. A V shaped cut away portion 837 of the dwell cam permits the driven member 833 to rotate when actuated by the cam roller 834 entering the radial slots 839. The driven member 833 is mounted on shaft 840 extending between the brackets 841 and 842 and is integral with a bevel gear 222 which meshes with bevel gear 221 on shaft 218 operatively connected through gear 223 to the turret wheel. As the shaft 237 rotates, the actuating member 832 of the Geneva movement engages a slot 839 and rotates the driven member together with shaft 840 through one sixth of a revolution at which time it leaves the radial slot and rotates through one half revolution before engaging the next succeeding radial slot. During this half revolution of the actuating member, the dwell cam 835 is in engagement with one of the curved surfaces 836 to hold the driven member accurately in position until the cam roller engages the next slot and so the intermittent rotation is repeated. This is communicated through shaft 840, bevelled gears 222 and 221, shaft 218, and gear 223 to the turret wheel which is likewise rotated to advance the apertures 204 step by step to the various stations described heretofore.

In order to reciprocate the plate 228, there is provided an eccentric 227 on the main drive shaft 811 which consists of a cam 845 rigidly and eccentrically mounted on the shaft and enveloped by a split collar 846 which is pivotally connected to the yoke 226 by the pin 847. The yoke 226 is attached to the plate 228 through the bolts 225 as described hereinbefore.

In a machine of this character, it is desirable from time to time to stop and start the various mechanisms. While this may be done by cutting the power off from the main motor, it is more desirable to provide a clutch for this purpose. An automatic clutch has been described hereinbefore whereby the mechanisms are rendered ineffective whenever, for any reason, the turret wheel fails to be correctly positioned with respect to the reciprocating plate at the time of the inward movement thereof. This automatic clutch together with a foot operated clutch is shown more particularly in Fig. 36, where there is shown also a pivoted clutch comprising a clutch member 850 having a curved cam surface 851 mounted thereon adapted to engage a corresponding curved surface on pin 852 to move the pin longitudinally out of engagement with the free end of shaft 811. In other words, when the clutch members 234 and 850 are in the positions shown in Fig. 36, the power is cut off. It is necessary that both of the clutch members 234 and 850 be out of engagement with the clutch for the pin 852 to connect the shaft 811 to the electric motor. In order to prevent the shaft 811 from rotating after one of the clutch members is actuated to stop the machine, a friction brake 855 is provided adjacent the clutch and may comprise a channel surface 856 having a belt 857 mounted thereon and secured to the framework of the machine at one end at 858 and also secured to the frame at the other end by spring 859.

The clutch member 850 is retained in effective position by spring 861 and may be moved to ineffective position by means of the treadle 862 through rod 864 and arm 865. The treadle 862 is held in its downward position by the member 865 which is resiliently retained against the treadle by means of the spring 866 attached to lever 868 and the framework of the machine at the gasket feeding end thereof, (see Fig. 3).

A rod 867 is pivotally mounted on the metallic plates 869 at the respective ends of the machine and is pivotally secured to the member 865. The plate 869 at the gasket feeding end of the machine is connected to the hand throw-out 870 through the lever 868. When the treadle 862 has been pressed down, the spring 866 operates to press the pivoted member 865 over the treadle and hold it in its downward position. The treadle may be released by pressure of the foot on the metallic plate 869 at the cap feeding end of the machine or by operation of the hand lever 870 at the gasket feeding end of the machine.

As stated hereinbefore, compressed air is supplied from a pumping mechanism in the feeding end of the machine to various mechanisms and particularly to the gasket feeding mechanism to positively force the gaskets along the guideway leading to the turret wheel and also to the capping mechanism to force the caps along the guideway therefor. The air hose 79 leading from the air pump is connected through pipe 874, valve 875, and pipe 418 to the nozzle 413 terminating in the guideway for the caps. This nozzle preferably is small and the air flows through it continuously unless the machine is stopped for a considerable period when it is cut off by means of the valve 875. A branch pipe 876 leads from the pipe 874 through an automatic valve 877 to pipe 878 having an air nozzle 157 thereon which expedites the movement of the gaskets to the turret wheel.

It is desirable to prevent the flow of air through this nozzle except when a gasket is released from the selecting mechanism and is to be driven along the guideway. For this purpose a member 880 is mounted above the automatic valve 877 and is adapted to be engaged by an extension 881 on the lever 315. The lever 315, as described hereinbefore, oscillates back and forth in response to a cam on the shaft 321 to oscillate through lever 314 the swinging arm 312 which positions gaskets over the apertures 204 in the turret wheel. Accordingly, each time the lever 315 oscillates downwardly to raise the arm 312 for the admission of a gasket, it engages the member 880 which actuates the automatic valve 877.

In order to prevent the release of compressed air when the clutch mechanism is thrown out and the machine stopped a slot 890 is formed in the member 880 adapted to accommodate the extension 881. When the treadle 862 is pressed downwardly to shut off the machine, the rod 867 moves to the left and rotates the metallic plate 869 on the gasket feeding end of the machine about its pivot 884 to move the rod 885 upwardly and to rotate the plate 886 about pivot 887 which in turn moves the member 880 to the left in Fig. 7 so that the extension 881 instead of engaging the enlarged portion of the member to force it against the automatic valve fits into the slot 890 and does not actuate the automatic valve. In this way, the mechanism for automatically supplying compressed air periodically to the gasket feeding mechanism is rendered ineffective whenever the machine is shut down.

In an invention involving a method and machine such as the one herein described, it is not possible to describe all of the various changes and modifications which might be made by a mechanic or by one skilled in the art. In the present description, therefore, a single embodiment has been shown and described with the understanding that various changes may be made in the construction, form and arrangement of the parts without departing from the spirit of the invention. It is desired that the above description be interpreted in all parts as illustrative and as descriptive of a preferred embodiment and not of all embodiments, and it is further desired that the description not be interpreted in a limiting sense.

Having thus described my invention, I claim:

1. In a machine of the class described, the combination of a turret wheel having a plurality of apertures therein, means for feeding caps to said apertures, devices for feeding gaskets to said apertures, a plate having a pair of pistons thereon adapted to enter said apertures to position said caps and said gaskets therein, means for reciprocating said plate, and mechanisms for intermittently rotating said wheel to bring said apertures in front of said pistons.

2. In a machine of the class described, the combination of a turret wheel having a plurality of seats thereon, devices for feeding caps and gaskets to said seats, a plate having a pair of pistons thereon adapted to engage said seats to position said caps and said gaskets thereon, means on said plate for assembling said caps and said gaskets, and mechanism for intermittently rotating said wheel to bring said seats in front of said pistons and said assembling means.

3. In a machine of the class described, the combination of means for seating a cap having a bead in the skirt thereof adapted to receive a flexible gasket, devices for constricting said flexible gasket and inserting it in said bead, and mechanism for delivering said caps with gaskets therein in stacked relation.

4. In a machine of the class described, the combination of means for seating a cap having an inward flange on the skirt thereof, means for constructing and inserting a flexible gasket in said skirt above said flange, and automatic means for delivering said caps with the gaskets therein in stacked relation.

5. In a machine of the class described, the combination of a mechanism for assembling caps and gaskets, a spindle adapted to pass through and support a plurality of flexible ring gaskets and means for feeding said gaskets individually from said spindle to said assembling mechanism.

6. In a machine of the class described, the combination of a rotatable device adapted to receive caps and gaskets, a member adapted to extend through and support a plurality of ring gaskets, a guideway leading to said rotatable device, and means for feeding individual ring gaskets of vulcanized rubber from said member to said guideway.

7. In a machine of the class described, the combination of a turret wheel adapted to receive caps and ring gaskets, a member adapted to support a plurality of said gaskets, means for feeding individual ring gaskets from said member to said wheel, devices for feeding caps to said wheel, mechanism for positioning said caps and said gaskets in said turret wheel and means for assembling said caps and said gaskets.

8. In a machine of the class described, the combination of a mechanism adapted to receive caps and gaskets, a rotatable head having a plurality of supporting members thereon adapted to support gaskets, means for feeding said gaskets individually to said mechanism, and devices for rotating said head to remove one supporting member from said feeding means and replace it by another.

9. In a machine of the class described, the combination of a mechanism for receiving caps and gaskets, a guideway leading to said mechanism, a rotatable head having a plurality of supporting members thereon adapted to support gaskets, a swinging arm for feeding said gaskets individually to said guideway, and devices for rotating said head to remove one supporting member from active position to replace it by another.

10. In a machine of the class described, the combination of a turret wheel having a plurality of seats thereon adapted to receive caps and gaskets, a disc member mounted adjacent said wheel having a plurality of members thereon, and means for moving said disc to insert said members into certain of said seats to position said caps and gaskets thereon in preparation for the assembly thereof.

11. In a machine of the class described, the combination of a turret wheel having a plurality of apertures adapted to receive caps and gaskets therein, a plate mounted adjacent said wheel having a plurality of members thereon, and means for reciprocating said plate to move said members into certain of said apertures to position said caps and gaskets thereon in preparation for the assembly thereof and thereafter assemble same.

12. In a machine of the class described, the combination of a rotatable member having a plurality of apertures adapted to receive gaskets, a plate mounted adjacent said rotatable member having a plurality of members thereon, and means for moving said members into certain of said apertures to position said caps and said gaskets, to assemble same, and to expel the assembled caps and gaskets from said apertures.

13. In a machine of the class described, the combination of a turret wheel having a plurality of apertures therein adapted to receive caps and gaskets, a disc mounted adjacent said wheel, members on said disc adapted to position said caps and said gaskets in said apertures, a device on said disc adapted to assemble said caps and said gaskets, means on said disc for expelling said caps and said gaskets, and mechanism for moving said disc toward said turret to bring the parts thereon into operative engagement with the caps and gaskets.

14. In a ring gasket feeding machine, the combination of a spindle adapted to support ring gaskets, helical threads on said spindle to move said gaskets longitudinally thereof when said spindle is rotated and devices for rotating said spindle.

15. In a ring gasket feeding mechanism, the combination of a spindle adapted to extend through and support rubber gaskets, means to move said gaskets longitudinally thereof, and an unthreaded portion on said spindle adapted to receive gaskets and rotate same.

16. In a device of the class described, the combination of a spindle adapted to support rubber gaskets, helical threads on said spindle to move said gaskets longitudinally when said spindle is rotated, a knurled portion at the end of said spindle adapted to receive gaskets from said helical threads and rotate same, devices for rotating said spindle, and means for engaging the gaskets rotating on said knurled portion to remove irregularities therein.

17. In a device of the class described, the combination of a spindle adapted to support rubber gaskets, means to move said gaskets longitudinally thereof when said spindle is rotated, devices for rotating said spindle, a second spindle and means for automatically substituting said second spindle for said first spindle when the first is moved from its operative position after the supply of gaskets thereon has been exhausted.

18. In a device of the class described, the combination of a spindle adapted to support gaskets, devices for rotating said spindle, a second spindle adapted to receive gaskets, and means to move said second spindle into operative position upon removal of the first spindle from its operative position.

19. In a device of the class described, the combination of a head, a spindle mounted on said head adapted to support said gaskets, threads on said spindle for moving the gaskets toward the end thereof, and rotating means adapted to engage and rotate said spindle when said head is in a predetermined position.

20. In a device of the class described, the combination of a rotatable head, a plurality of spindles mounted on said head adapted to support gaskets, threads on said spindles for moving the gaskets toward the ends thereof, and rotating means adapted to engage and rotate said spindles consecutively when said head is rotated to predetermined positions.

21. In a device of the class described, the combination of a member, a plurality of spindles on said member adapted to support gaskets, means for moving said gaskets to the ends of said spindles, devices for operating said means when said member is in predetermined positions, and mechanism for moving said spindles to said predetermined positions.

22. In a device of the class described, the combination of a movable head, a plurality of spindles on said head adapted to support gaskets, means for moving said gaskets to the ends of said spindles, devices for operating said means when said head is in predetermined positions, mechanism for moving said spindles to said predetermined positions and means for removing said gaskets from said spindles.

23. In a device of the class described, the combination of a rotatable head, a plurality of spindles on said head adapted to support gaskets, gears at one end of each of said spindles, threads on said spindles adapted to engage said gaskets, a pair of driving gears for engaging certain of said other gears for rotating certain of said spindles and mechanism for rotating said head to cause the gears on said spindles to engage consecutively said driving gears.

24. In a device of the class described, the combination of a shaft, a rotatable head on one end of said shaft, a plurality of spindles on said head, a collar on the other end of said shaft having a handle attached thereto, depressions in said collar, and a cam adapted to engage said depressions to yieldably hold said shaft in position.

25. In a device of the class described, the combination of a movable head, a plurality of rotatable spindles on said head adapted to support gaskets, a gear at one end of each of said spindles, a gear adapted to mesh with the gear of one of said spindles to rotate same for agitating the gaskets when said head is in predetermined positions, and a cam adapted to stop said head in said positions and to yieldably hold it there.

26. In a device of the class described, the combination of a member adapted to extend through and support a plurality of flexible ring gaskets, means to retain said gaskets on said member, devices for operating said means to release a single gasket, and mechanism for receiving said single gasket.

27. In a device of the class described, the combination of a member adapted to support a plurality of ring gaskets, a roller adapted to engage certain of said gaskets to remove irregularities therein, devices adapted to release a single gasket, and mechanism for receiving said single gasket.

28. In a device of the class described, the combination of a member adapted to support a plurality of gaskets, means to retain said gaskets on said member, devices for operating said means to release a single gasket, and a swinging arm adapted to receive said gasket and transfer it to another position.

29. In a device of the class described, the combination of a rotatable member adapted to support a plurality of gaskets, means engaging certain of said gaskets to remove irregularities therein, a guideway for receiving individual gaskets and devices to engage and place said gaskets in said guideway.

30. In a device of the class described, the combination of a rotatable member adapted to support a plurality of gaskets, a roller engaging and pressing certain of said gaskets against said member to remove irregularities therein, a guideway for receiving individual gaskets, and devices adapted to receive gaskets from said member and said roller and place said gaskets in said guideway.

31. In a device of the class described, the combination of a rotatable member having screw threads thereon adapted to engage and move gaskets toward the end of said member, a knurled roller mounted adjacent the end of said member to engage and straighten the gaskets as they move along said member, a stop to hold said gaskets on said member, and devices for removing said stop to feed said gaskets one at a time.

32. In a device of the class described, the combination of a rotatable member having screw threads thereon adapted to engage and move gaskets toward the end of said member, a roller mounted adjacent the end of said member to engage and straighten the gaskets as they move along said member, a stop to hold said gaskets on said member, devices for removing said stop to feed said gaskets one at a time, a guideway, and a swinging arm adapted to receive said gaskets as they leave said member and deliver them to said guideway.

33. In a device of the class described, the combination of a rotatable member having means thereon adapted to move gaskets toward the end thereof, a roller mounted adjacent the end of said member adapted to engage and straighten the gaskets as they move along said member, a stop adapted to hold said gaskets on said member, devices for removing said stop to feed said gaskets one at a time, and a swinging arm adapted to receive said gaskets as they leave said member.

34. In a device of the class described, the combination of a rotatable member, means adapted to move gaskets toward the end of said member, a roller mounted adjacent the end of said member to engage and straighten the gaskets as they move along said member, a stop to hold said gaskets on said member, devices for removing said stop to feed said gaskets one at a time, a guideway for said gaskets, a swinging arm adapted to receive said gaskets as they leave said member and deliver them to said guideway, and means for directing a blast of air on said gaskets as they enter said guideway.

35. In a device of the class described, the combination of a supporting spindle for ring gaskets and the like, a member mounted adjacent said spindle, a stop to retain said gaskets thereon, means to remove said stop from said spindle to permit a gasket to move on to said member, and devices for causing said member to drop said gasket.

36. In a device of the class described, the combination of a member adapted to extend through and support flexible ring gaskets and the like, a member mounted adjacent said support with one end in engagement with an end of said support, a stop to retain said gaskets on said support, and means to move said stop to permit a gasket to move on to said member.

37. In a device of the class described, the combination of a support for retaining ring gaskets and the like in substantially vertical planes, a member mounted adjacent said support, with one end in engagement with an end of said support, a stop between said member and said support to retain said ring gaskets on said support, means to move said stop to permit a gasket to move on to said member, and devices for causing said member to release said gasket.

38. In a device of the class described, the combination of a spindle for supporting gaskets and the like, a member mounted adjacent said spindle having one of its ends in contact with an end of said spindle, a stop adapted to prevent gaskets from traveling from said spindle on to said member, devices mounted over said member to allow space for a gasket, means for moving said stop to permit a gasket to travel from said spindle to said member, and for returning said stop thereafter, and mechanism for moving said member relative to said devices to release said gasket.

39. In a device of the class described, the combination of a spindle for supporting gaskets and the like, a member having one of its ends adjacent an end of said spindle, a stop adapted to prevent gaskets from traveling from said spindle on to said member, devices mounted over said member to allow space for a gasket on the end thereof, means for moving said stop to permit a gasket to travel from said spindle to said member and for returning said stop thereafter, and mechanism to release said gasket.

40. In a device of the class described, the combination of a spindle for supporting gaskets and the like, a member having one of its ends adjacent an end of said spindle, a stop adapted to prevent gaskets from travelling from said spindle on to said member, devices mounted over said member to allow space for a gasket on the end thereof, means for moving said stop to permit a gasket to travel from said spindle to said member, and for returning said stop thereafter, and mechanism to release said gasket.

41. In a device of the class described, the combination of a spindle for supporting gaskets and the like, a member having one of its ends adjacent an end of said spindle, a stop adapted to prevent gaskets from travelling from said spindle on to said member, devices mounted over said member having space for a gasket on the end thereof, means for moving said stop to permit a single gasket to travel from said spindle to said member and for returning said stop thereafter, mechanism to release said gasket, and an arm adapted to engage said released gasket and deliver it to other mechanism.

42. In a device of the class described, the combination of a spindle for supporting gaskets and the like, a member having one of its ends adjacent an end of the spindle, a flat blade adapted to fit over the end of said member, and a shaft having a pair of cams thereon, one of said cams being adapted to operate said blade to raise it from said member to permit a gasket to move from said spindle on to said member and to return said blade thereafter, the other of said cams being adapted to move said member and release said gasket.

43. In a device of the class described, the combination of a spindle for supporting gaskets and the like, a member having one of its ends adjacent an end of the spindle, a flat blade adapted to fit over the end of said member, a shaft having a plurality of cams thereon, one of said cams being adapted to operate said blade to raise it from said member to permit a gasket to move from said spindle on to said member and to return said blade thereafter, the other of said cams being adapted to move said member and release said gasket, a swinging arm adapted to receive the gaskets released, and a third cam adapted to operate said swinging arm.

44. In a device of the class described, the combination of a swinging arm, mechanism for placing gaskets on said arm, a lever attached to said arm, a pivoted lever engaging said other lever, a cam engaging said pivoted lever to operate said swinging arm, and means permitting said pivoted lever to yield if the resistance to movement of the swinging arm exceeds a predetermined amount.

45. In a machine of the class described, the combination of a guideway for receiving gaskets and the like, a spindle adapted to extend through and support a group of gaskets, feeding mechanism at one end of the guideway to select gaskets from said spindle and feed them to said guideway, and a rotatable member at the other end of said guideway having a plurality of seats therein to receive gaskets.

46. In a machine of the class described, the combination of a turret wheel rotatably mounted, having a plurality of apertures formed therein, means for feeding gaskets to said turret wheel, means for closing about said gaskets to align them with said apertures, and devices for pressing said gaskets into said apertures.

47. In a machine of the class described, the combination of a rotatable member having a plurality of apertures formed therein, a curved arm adapted to close about and align gaskets in front of said apertures, and devices to positively engage and position said gaskets in said apertures.

48. In a machine of the class described, the combination of a turret wheel having a plurality of apertures formed therein, an arm having a curved surface adapted to close about and position gaskets in front of said apertures and to form substantially an extension of said apertures, and a member adapted to engage said positioned gaskets and place them in said apertures.

49. In a machine of the class described, the combination of a guideway for gaskets and the like, a swinging arm adapted to place gaskets in said guideway, means for directing a blast of air to drive said gaskets along said guideway, a turret wheel at the other end of the guideway, and means for positioning said gaskets in said turret wheel.

50. In a machine of the class described, the combination of a guideway for gaskets and the like, a swinging arm adapted to place gaskets in said guideway, means for directing a blast of air to drive said gaskets along said guideway, a turret wheel at the other end of the guideway, means to place said gaskets in front of said turret wheel, and means for positioning said gaskets in said turret wheel.

51. In a machine of the class described, the combination of a plate having an aperture therein adapted to receive a gasket, a guideway extending over and terminating at the further side of said aperture, the end of said guideway having a curvature similar to the curvature of said aperture, and an arm having a curved surface adapted to enter said guideway and to form an extension of said aperture.

52. In a machine of the class described, the combination of a plate having an aperture therein adapted to receive a gasket, a guideway extending over and terminating at the further side of said aperture, the end of said guideway having a curvature similar to the curvature of said aperture, and an arm having a curved surface adapted to enter said guideway, engage a gasket therein, and to form with the end of the guideway an extension of said aperture with the engaged gasket in the extension.

53. In a machine of the class described, the combination of a plate having an aperture therein adapted to receive a gasket, a guideway extending over and terminating at the further side of said aperture, the end of said guideway having a curvature similar to the curvature of said aperture, an arm having a curved surface adapted to enter said guideway and to form an extension of said aperture with a gasket in the extension, and means adapted to engage the gasket in said extension and position it in said aperture.

54. In a machine of the class described, the combination of a rotatable member having an aperture therein adapted to receive a gasket, a pair of discs on the respective sides of said rotatable member, means for pressing one of said discs into said aperture a predetermined distance, a spring tending to press said other disc into said aperture, and devices for permitting said disc to enter said aperture through the intermediation of said spring to press said gasket against the other disc and position it in said aperture.

55. In a machine of the class described, the combination of a turret wheel having apertures therein adapted to receive gaskets, a pair of discs on the respective sides of said turret wheel adapted to enter said apertures consecutively, means for pressing said discs into said apertures to position gaskets therein, and means for withdrawing said discs from said apertures.

56. In a machine of the class described, the combination of a turret wheel having a plurality of seats adapted to accommodate gaskets, a guideway for caps leading to said turret wheel, and devices responsive to the gaskets on said seats for feeding caps to said turret wheel.

57. In a machine of the class described, the combination of a turret wheel having a plurality of apertures therein adapted to accommodate gaskets, a guideway for caps leading to said wheel, devices responsive to the gaskets in said apertures for feeding caps to said apertures, said responsive devices being adapted to feed a cap to each aperture in said turret having a gasket therein, and means for placing said caps in said apertures adjacent said gaskets.

58. In a machine of the class described, the combination of a turret wheel having a plurality of apertures adapted to accommodate gaskets, a guideway for caps leading to said turret wheel, devices responsive to the gaskets in said apertures for feeding caps to said turret, and means for placing said caps in said apertures adjacent said gaskets.

59. In a machine of the class described, the combination of a rotatable member having a plurality of apertures therein adapted to accommodate gaskets, means for feeding caps individually to the apertures in said rotatable member, and devices adapted to engage gaskets in said apertures and to stop said cap feeding means when an aperture fails to have a gasket therein.

60. In a machine of the class described, the combination of a turret wheel having a plurality of apertures therein adapted to accommodate gaskets, means for feeding caps individually to the apertures in said wheel, and devices adapted to engage gaskets in said apertures and to stop said cap feeding means when an aperture fails to have a gasket therein, said devices being adapted to permit said cap feeding means to resume its operation when an aperture appears with a gasket therein.

61. In a machine of the class described, the combination of a turret wheel having a plurality of seats therein adapted to receive caps, means for feeding caps to said seats, devices for placing the caps on the seats, and resilient means mounted on said turret wheel back of said seats for positively holding the caps so placed.

62. In a machine of the class described, the combination of a turret wheel having a plurality of apertures therein adapted to seat caps, each of said apertures having a shoulder formed adjacent one end, devices for pressing a cap against said shoulder, and means projecting from the side wall of said apertures for locking the cap in position against said shoulder.

63. In a machine of the class described, the combination of a rotatable member having a plurality of apertures therein, adapted to seat gaskets, and devices adapted to engage gaskets in said apertures to feed caps to the apertures having gaskets on the side walls thereof and to prevent feeding of caps to apertures not having gaskets on the side wall thereof.

64. In a machine of the class described, the combination of seats for ring gaskets, means for feeding caps to said seats, and devices responsive to said gaskets on said seats to feed caps only to seats having gaskets thereon.

65. In a machine of the class described, the combination of a member having an aperture therein adapted to seat a gasket, a cap feeding mechanism, and devices adapted to engage the side wall of said aperture to cause the feeding of a cap to said aperture when a gasket is thereon and to prevent the feeding of a cap otherwise.

66. In a machine of the class described, the combination of a member having a plurality of apertures therein, means for rotating said member intermittently, a guideway for caps terminating adjacent a point at which the respective apertures stop, a pair of oppositely disposed members for engaging the caps at the end of the guideway, correcting their positions, and pressing them from the guideway into the apertures and means for locking the caps in the apertures.

67. In a machine of the class described, the combination of a turret wheel having a plurality of apertures therein adapted to seat gaskets, means for rotating said turret wheel intermittently, a guideway for caps terminating adjacent a point at which the respective apertures stop, devices for feeding caps to the end of the guideway, and mechanism for preventing the feeding of a cap to the end of the guideway when an aperture passes having no gasket therein.

68. In a device of the class described, the combination of a rotatable member having apertures therein, means for placing rubber ring gaskets in said apertures, devices for placing caps in said apertures, and mechanism for constricting said gaskets against a cylindrical surface smaller in size than the skirt of the caps and for inserting said gaskets thus constricted into the caps to assemble said caps and said gaskets.

69. In a device of the class described, the combination of a member having a seat therein, means for placing a gasket in said seat, devices for placing a cap in said seat, and mechanism for constricting said gasket about a substantially cylindrical surface and for assembling said cap and said gasket.

70. In a device of the class described, the combination of a member having an aperture adapted to seat a cap and a ring gasket therein, and means for forming a loop in said gasket and inserting it in said cap.

71. In a device of the class described, the combinataion of a member adapted to seat a cap and a ring gasket, and means adapted to form a loop in said gasket and place it in said cap.

72. In a device of the class described, the combination of a member adapted to seat a cap and a flexible ring gasket of rubber, and means adapted to engage and reduce the size of said gasket independently of the cap and place it in said cap, thereafter releasing said gasket and permitting it to return to its normal shape.

73. In a device for inserting ring gaskets in caps having a depending skirt, the combination of devices adapted to engage a gasket at a plurality of points to constrict said gasket about a cylindrical surface, means for inserting the constricted gasket within the skirt of the cap, and means co-operating with said constricting devices for releasing the constricted gasket to permit it to conform to the skirt of the cap.

74. In a device for inserting gaskets in caps having a depending skirt, the combination of a member adapted to engage a gasket about a cylindrical surface, means for moving said member to constrict said gasket, mechanism for inserting the constricted gasket within the skirt of the cap, and devices co-operating with said constricting means for releasing the constricted gasket to permit it to conform to the skirt of the cap.

75. In a device for inserting gaskets in caps having a depending skirt, the combination of a pair of jaws adapted to engage a gasket, means for moving said jaws toward each other to deform and constrict said gasket about a cylindrical surface, mechanism for inserting the constricted gasket within the skirt of a cap, and devices co-operating with said constricting means for releasing the constricted gasket to permit it to conform to the skirt of the cap.

76. In a device for inserting gaskets in caps having a depending skirt, the combination of a disc member adapted to fit into the cap, means for placing a gasket on said disc member, a pair of jaws adapted to engage said gasket and to constrict it about said disc, devices for inserting said disc and said gasket into a cap, and means for disengaging said jaws to permit said gasket to assume its normal shape in the skirt of the cap.

77. In a device for inserting gaskets in caps having a depending skirt, the combination of a member having an aperture therein, adapted to seat a cap and a gasket, a member adapted to fit into said gasket and said cap, devices for inserting said member through said gasket into said cap, and means for constricting the gasket about said member prior to its entry into the cap and means for releasing the gasket while said member is in the cap.

78. In a device of the class described, the combination of a rotatable member having apertures therein adapted to seat caps and ring gaskets, mechanism for rotating said rotatable member intermittently, and devices for constricting said ring gaskets, inserting them into the caps, and thereafter permitting the gaskets to assume their normal shape in the skirts of the caps.

79. In a machine of the class described, the combination of a pair of jaws adapted to engage and constrict a gasket, and devices for pressing said gasket into the skirt of the cap, said jaws being pressed out of engagement with the gasket by the skirt of the cap.

80. In a device of the class described, the combination of a disc member adapted to be inserted into a ring gasket, a pair of pivotally mounted jaws adapted to engage the gasket at diametrically opposite points, means for closing said jaws to pull said engaged portions toward each other to constrict said gasket about said disc member, and devices for inserting said disc into a cap, the skirt of the cap engaging the jaws to release the gasket therefrom.

81. In a device of the class described, the combination of a disc member adapted to be inserted into a ring gasket, a plurality of pivotally mounted jaws adapted to engage the gasket at a plurality of points, means for closing said jaws to pull said engaged portions toward each other to constrict said gasket about said disc member, devices for inserting said disc into a cap and means for opening said jaws when the disc enters the cap, the skirt of the cap engaging a portion of said jaws to release the gasket therefrom.

82. In a device of the class described, the combination of a rotatable member having a plurality of apertures adapted to accommodate caps and gaskets, said apertures having slots in the side walls thereof, and a pair of jaws adapted to move in said slots to assemble said caps and said gaskets.

83. In combination, a member having a cylindrical surface at one of its ends, adapted to fit into a ring gasket, a pair of jaws adapted to be pivotally mounted in suitable slots in said member, the ends of said jaws being adapted to oscillate through said cylindrical surface to constrict said gasket, and means for oscillating said jaws.

84. In a machine of the class described, the combination of a rotatable member having a plurality of apertures therein adapted to seat caps, substantially horizontally extending means mounted adjacent said rotatable member to receive the caps therefrom, devices to expel said caps from said apertures on to said means in stacked relation, and automatic means for engaging the caps on said means to hold said removed caps in position and to prevent the return of said removed caps on said first mentioned means.

85. In a machine of the class described, the combination of a turret wheel mounted in a substantially vertical plane having a plurality of seats therein adapted to receive caps, mechanism for intermittently rotating said wheel, substantially horizontal supporting means mounted adjacent said turret wheel to receive the caps therefrom, devices to expel said caps from said seats in stacked relation on to said means as the seats stop adjacent said means, and automatic means for holding said removed caps in vertical position on said supporting means.

86. In a machine of the class described, the combination of a rotatable member having a plurality of apertures therein, certain of said apertures having assembled caps and gaskets therein, other apertures having ring gaskets therein, mechanism for rotating said rotatable member, supporting means adjacent said rotatable member to receive the caps therefrom, and means for moving said assembled caps and gaskets from said apertures in stacked relation on to said supporting means without disturbing the unassembled ring gaskets in certain of said apertures passing said supporting means.

87. In a machine of the class described, the combination of a turret wheel having a plurality of apertures, certain of said apertures having assembled caps and gaskets therein, other apertures having only ring gaskets therein, mechanism for rotating said turret wheel, means for moving said assembled caps and gaskets from said apertures without disturbing the unassembled ring gaskets in the apertures passing said means, and automatic devices for preventing said caps from re-entering said apertures.

88. In a machine of the class described, the combination of a turret wheel having a plurality of apertures therein, certain of said apertures having assembled caps and gaskets therein, other apertures having ring gaskets therein, mechanism for rotating said wheel, means for moving said assembled caps and gaskets from said apertures without disturbing unassembled gaskets, and devices for removing said unassembled ring gaskets from said apertures.

89. In a machine of the class described, the combination of a rotatable member having a plurality of apertures therein, certain of said apertures having assembled caps and gaskets therein, other apertures having ring gaskets therein, means for removing said assembled caps and gaskets from said apertures, supporting means adapted to receive said removed caps, automatic devices for retaining said caps on said supporting means, and devices for removing said unassembled ring gaskets from said apertures.

90. In a machine of the class described, the combination of a turret wheel having a plurality of apertures, certain of said apertures having assembled caps and gaskets therein and other apertures having gaskets therein, means for intermittently rotating said turret wheel, and a reciprocating member having a pair of discs thereon adapted to enter apertures in said wheel during the stop periods, one of said discs being adapted to remove the assembled caps and gaskets, the other disc being adapted to enter an aperture simultaneously to remove any unassembled gaskets therein.

91. In a machine of the class described, the combination of a rotatable member having a plurality of apertures, certain of said apertures having assembled caps and gaskets therein, and other apertures having gaskets therein, and a reciprocating member having a pair of discs thereon adapted to enter apertures simultaneously, one of said discs being adapted to remove assembled caps and gaskets, and the other of said discs being adapted to remove any gaskets left in the apertures by said first disc.

92. The method of assembling closure caps and ring gaskets which method comprises decreasing the size of a gasket by forming a kink therein, inserting the gasket within the cap while decreased in size, and permitting it to expand and engage the skirt of the cap.

93. The method of assembling closure caps and ring gaskets which method comprises decreasing the size of the gasket by forming a pair of kinks therein, inserting the gasket within the cap while decreased in size, and permitting it to expand and engage the skirt of the cap.

94. The method of assembling closure caps and ring gaskets, which method comprises decreasing the size of the gasket by forming a pair of diametrically opposed kinks therein, inserting the gasket within the cap while decreased in size, and permitting it to expand and engage the skirt of the cap.

95. The method of assembling closure caps and ring gaskets, which method comprises drawing the gasket tightly about a cylindrical form by forming a kink therein, inserting the gasket in its deformed state into a cap, and permitting it to return to its normal shape.

96. The method of assembling ring gaskets and closure caps having beads therein, which method comprises drawing the gasket tightly about a cylindrical form by pulling a portion of the gasket within the cylindrical form, inserting the gasket as deformed into a cap and permitting it to return to its normal shape in the bead of the cap.

97. The method of assembling ring gaskets and closure caps having beads therein, which method comprises drawing the gasket tightly above a cylindrical form by pulling diametrically opposed portions of the gasket within the form to decrease the size thereof, inserting the gasket in its deformed state into a cap and permitting it to return to its normal size.

98. The method of feeding gaskets, which method comprises rotating a group of gaskets, removing the irregularities in the respective gaskets at one end of the group, selecting individual gaskets at said end of the group and delivering them to an assembling mechanism.

99. The method of feeding ring gaskets which comprises rotating a group of gaskets, removing the irregularities in the gaskets at one end of the group by rolling them into a single layer, selecting gaskets from said layer, and moving them to a desired position.

100. The method of feeding gaskets to a suitable machine, which method comprises rotating a mass of deformed ring gaskets, removing the irregularities in the respective gaskets at one end of the group by rolling them in a single layer, permitting said gaskets to be dropped individually at the end of the rolling operation, and moving the gaskets dropped to a desired position.

101. The method of feeding gaskets to a suitable machine which method comprises rotating a mass of ring gaskets, separating the gaskets at one end of the mass into a group, the individual gaskets of which are lying side by side, releasing consecutively the gaskets of said group, and moving the released gaskets to a desired position.

102. The method of feeding gaskets which comprises rotating a group thereof, subjecting the gaskets adjacent one end of the group to pressure during rotation to eliminate irregularities therein, and releasing the gaskets individually from said end at predetermined time intervals.

103. The method of feeding gaskets to a machine, which method comprises rotating a group of ring gaskets, compressing those adjacent one end of the group to eliminate irregularities therein and to separate them into a layer of single thickness, releasing the gaskets individually from said end at predetermined time intervals, and conveying said gaskets individually to the machine to be fed.

104. In a machine of the class described, the combination of a plate having an aperture therein adapted to receive a gasket and devices adapted to close about said gasket to form substantially an extension of said aperture to position said gasket in front of same.

105. In a machine of the class described, the combination of a plate having an aperture therein adapted to receive a gasket, devices adapted to close about said gasket to form substantially an extension of said aperture, and means to move said gasket from the extension into the aperture while held in position by said devices.

106. In a device of the class described, the combination of a guideway for caps and the like adapted to permit caps to slide therein, a pivoted member mounted at the side of said guideway having a substantially V-shaped recess to receive the cap, and means for oscillating said member to release said engaged cap held by the forward side of said V, the other side of the said V serving to positively move said cap along the guideway and prevent the other cap from following.

107. In a machine of the class described, the combination of a member having a plurality of seats thereon adapted to accommodate ring gaskets, means for feeding caps individually, and devices adapted to engage the ring gaskets on said seats and to stop said cap feeding means when a seat passes without a gasket thereon.

108. In combination, a member adapted to fit into a ring gasket, means for constricting said gasket about said member, and means for inserting a gasket into the cap while constricted and for thereafter releasing the gasket to permit it to conform to the skirt of the cap.

109. The method of feeding gaskets, which method comprises rotating a group of substantially aligned flexible ring gaskets and selecting individual gaskets at one end of said rotating group.

110. In a device of the class described, the combination of a rotatable member, a spindle adapted to receive and rotate a group of gaskets and mechanism for feeding said gaskets from said spindle to said rotatable member.

111. In a device of the class described, the combination of a spindle adapted to support ring gaskets, means for moving said gaskets longitudinally thereof, and means for engaging the gaskets on said spindle to remove irregularities therein.

112. In a device of the class described, the combination of an arm, means on said arm extending into a guideway and adapted to receive a gasket, and devices for moving said arm to move gaskets along said guideway, said means being adapted to move out of said guideway to release said gasket.

113. In a gasket feeding device, the combination of means having an extension thereon adapted to extend into a guideway, said extension having a notch therein adapted to receive and hold a gasket, and devices for actuating said means, whereby said gasket is moved along said guideway and released from said notch.

114. In a machine of the class described, the combination of a rotatable member adapted to receive caps and flexible rubber ring gaskets, means for separating said ring gaskets from a group of gaskets, means for feeding said flexible ring gaskets to said rotatable member, devices for feeding caps thereto, mechanism for seating said caps and said gaskets in unassembled state in said rotatable member, and means for assembling said caps and said gaskets by constriction of the gasket before insertion.

115. In a device of the class described, the combination of a member adapted to extend into a ring gasket, means for constricting said gasket while it is about said member, and means for inserting said member with the gasket thereon into the skirt of a cap, and means for releasing said gasket after it has been inserted into the cap to permit it to conform to the skirt of the cap.

116. The method of feeding gaskets, which method comprises moving a group of ring gaskets along a spindle to separate same, removing irregularities in certain of said gaskets, and selecting individual gaskets from said group.

117. The method of feeding gaskets, which method comprises moving a group of flexible rubber ring gaskets along a spindle to separate the respective gaskets, selecting individual gaskets from one end of said group, and feeding said gaskets individually to a machine.

118. In a device for inserting ring gaskets in caps having depending skirts, the combination of a member having a substantially cylindrical surface adapted to fit into a ring gasket, movable members adapted to engage the outer periphery of a flexible ring gasket at a plurality of points, said movable members being adapted to move inwardly toward said cylindrical surface to constrict said gasket about said cylindrical surface, means for inserting the constricted gasket into the skirt of the cap, and means for operating said constricting members to constrict and release the gasket.

119. In a device for inserting ring gaskets in caps having depending skirts, the combination of a member having a substantially cylindrical surface, a plurality of members adapted to engage the outer periphery of a flexible ring gasket, said members being adapted to move inwardly toward said cylindrical surface to constrict said gasket, thereby to permit it to be inserted into the skirt of the cap, and means for inserting the constricted gasket into the skirt of the cap.

FREDERICK G. WIELAND.